US010306203B1

(12) United States Patent
Goyal et al.

(10) Patent No.: US 10,306,203 B1
(45) Date of Patent: May 28, 2019

(54) ADAPTIVE DEPTH SENSING OF SCENES BY TARGETED LIGHT PROJECTIONS

(71) Applicant: Amazon Technologies, Inc., Seattle, WA (US)

(72) Inventors: Dushyant Goyal, Redmond, WA (US); Pragyana K. Mishra, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 189 days.

(21) Appl. No.: 15/191,345

(22) Filed: Jun. 23, 2016

(51) Int. Cl.
*H04N 13/254* (2018.01)
*H04N 13/25* (2018.01)
*H04N 13/128* (2018.01)
*H04N 13/271* (2018.01)
*H04N 13/275* (2018.01)

(52) U.S. Cl.
CPC ........... *H04N 13/128* (2018.05); *H04N 13/25* (2018.05); *H04N 13/254* (2018.05); *H04N 13/271* (2018.05); *H04N 13/275* (2018.05)

(58) Field of Classification Search
None
See application file for complete search history.

(56) References Cited

U.S. PATENT DOCUMENTS

| 9,300,901 | B2 * | 3/2016 | Grundhofer | H04N 5/7458 |
| 2007/0065002 | A1 * | 3/2007 | Marzell | G06T 17/00 |
| | | | | 382/154 |
| 2011/0057930 | A1 * | 3/2011 | Keller | G06T 15/205 |
| | | | | 345/419 |
| 2017/0323455 | A1 * | 11/2017 | Bittan | G06T 7/50 |
| 2018/0033145 | A1 * | 2/2018 | Schoenberg | G06T 5/40 |

FOREIGN PATENT DOCUMENTS

WO     WO 2015/107529     * 1/2015

* cited by examiner

*Primary Examiner* — Tahmina N Ansari
(74) *Attorney, Agent, or Firm* — Athorus, PLLC

(57) ABSTRACT

Three-dimensional models of objects may be generated according to adaptive depth sensing techniques. An imaging device may include a projector that is configured to project light (e.g., infrared light) onto selected portions of a scene, and a depth imaging sensor configured to capture reflections of the projected light. The projector may be used to project points of light onto aspects of a scene having high degrees of variation of depth, color, texture, curvature or other attributes, where an increased number of depth values may be required to accurately depict a profile of an object within a scene, and to avoid projecting light onto aspects of the scene having low degrees of variation of depth, color, texture, curvature or such other attributes, where the profile of the object may be accurately represented by comparatively fewer depth values.

20 Claims, 23 Drawing Sheets

DEPTH IMAGE (VALUES IN METERS)

DEPTH IMAGE (VALUES IN METERS)

US 10,306,203 B1

ADAPTIVE DEPTH SENSING OF SCENES BY TARGETED LIGHT PROJECTIONS

BACKGROUND

A depth model of an object, or a depth profile of the object, may be obtained according to a number of range imaging techniques. Many processes for obtaining depth models or profiles of objects, or ranges to such objects, operate by projecting visible or invisible light from a projector or other source, receiving reflections of the projected light by a sensor, and interpreting such reflections by one or more computer processors. For example, a structured-light three-dimensional scanner may be used to illuminate a scene with a specially designed light pattern, e.g., horizontal and vertical lines, points or patterns, and depths to objects within the scene may be determined using images of the reflected light. As another example, a time-of-flight sensor may also be used to illuminate a scene with points of light, to collect reflections of the light from aspects of the scene. Times elapsed between an emission of light and a return of the light to each pixel may be measured and multiplied by the speed of light to determine distances to aspects corresponding to each pixel.

Imaging systems for obtaining depth models or profiles of objects, or ranges to such objects, typically project light onto a scene in regular, evenly distributed patterns, e.g., a raster pattern, or a pattern by which an area is scanned in straight lines from side-to-side and from top-to-bottom, or randomized patterns. Likewise, reflections of projected light are typically captured and reflected in the order or manner in which such reflections are received. Thus, imaging systems for obtaining depth models or profiles of scenes, or ranges to objects within such scenes, typically operate without regard to the content of the scenes, treating each of the aspects within such scenes as being equally relevant or having identical levels of complexity. Where imaging systems are used to obtain depth models, depth profiles or ranges from a scene that features aspects having both low degrees of entropy or depth variation, and high degrees of entropy or depth variation, end products generated by such systems represent the scene in a homogenous manner. Frequently, points or patterns of light that are projected onto and reflected from surfaces with stable, consistent or infrequently changing depths or ranges are wasted, as such surfaces may be accurately described with a comparatively low number of depths or ranges. Conversely, surfaces featuring unstable, inconsistent or frequently changing depths or ranges are not accurately described by a set of points that are generally cast upon such surfaces according to a raster pattern, or are reflected from such surfaces and interpreted according to a raster.

Currently, the only known technique for enhancing the accuracy and precision of depth models or depth profiles of objects, or ranges to such objects, is to increase the density of the points of light projected upon such objects. Increasing the density of points of light projected upon a surface, however, would require larger and substantially more complicated projector equipment, and capturing and interpreting reflections of such light would consume increased amounts of available bandwidth, processing power, storage capacity or other computer-based resources. Moreover, increasing the density of points of light projected upon a surface may have limited effectiveness in sampling an object's shape at its sharpest points, e.g., corners or edges of the object, and would only increase the amount of resources being wasted when sampling surfaces of objects that are stable, consistent or infrequently changing.

DETAILED DESCRIPTION

Figure 1A:
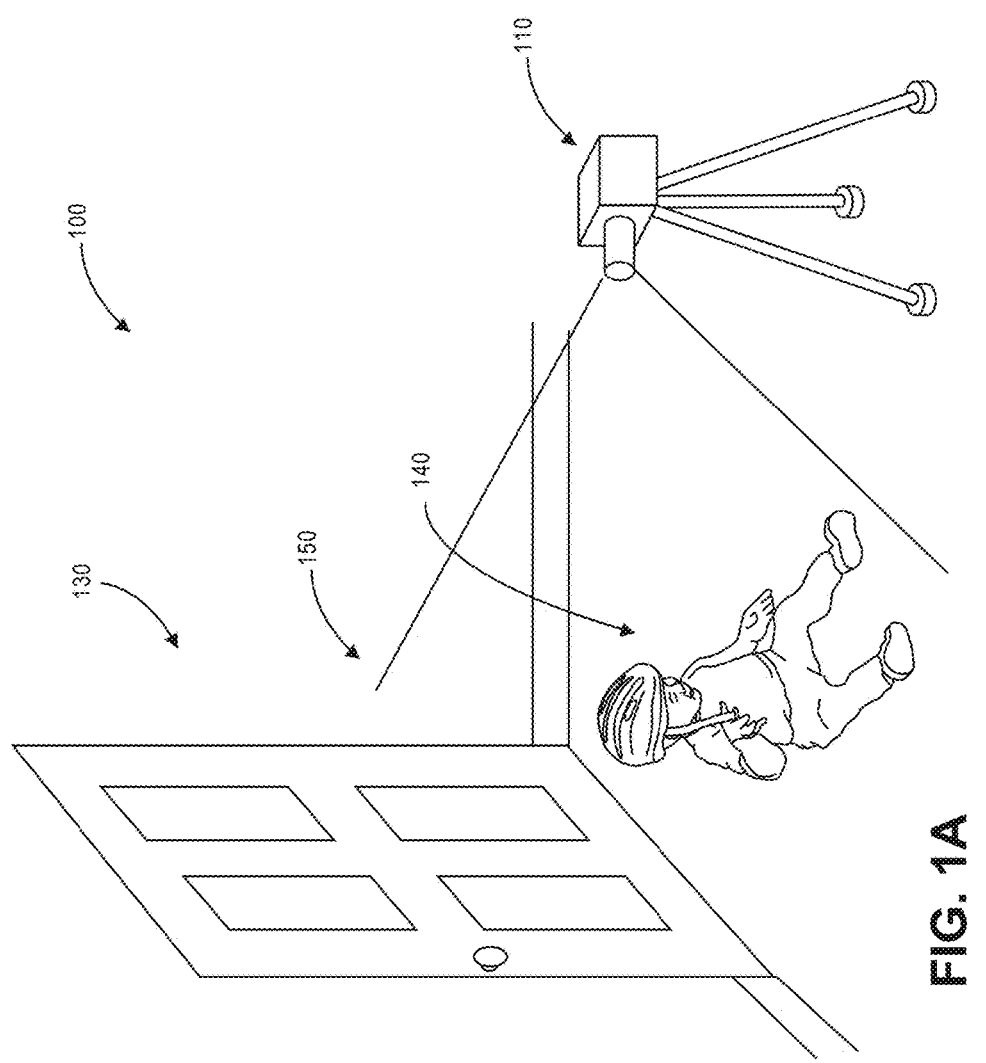
FIG. 1A through FIG. 1H are views of aspects of a system for depth sensing in accordance with embodiments of the present disclosure.

As is set forth in greater detail below, the present disclosure is directed to adaptive systems and methods for depth sensing. More specifically, the systems and methods of the present disclosure may be utilized to efficiently generate accurate and precise 3D models of objects by adaptively selecting specific regions or sectors of scenes that are to be sampled according to traditional range imaging techniques (e.g., structured-light range imaging or time-of-flight range imaging). Imaging data that includes visual imaging data (e.g., color, grayscale or black-and-white still or moving images) and/or depth imaging data (e.g., two-dimensional representations of ranges from an imaging sensor to objects within a field of view of the imaging sensor) may be captured from a scene and evaluated to recognize any particularly relevant features within backgrounds or foregrounds of the imaging data. For example, a visual image captured from a scene may be interpreted to recognize any edges, contours, outlines, colors, textures, silhouettes, shapes or other characteristics of background or foreground objects within the scene, while a depth image captured from the scene may be interpreted to recognize any variations in depths or ranges to background or foreground objects within the scene.

Subsequently, the scene may be divided or partitioned into two or more regions or sectors based on attributes of visual imaging data or depth imaging data captured from the scene. One or more of such regions or sectors may be selected on any basis, e.g., based on any attributes of the visual imaging data or the depth imaging data from which the regions or sectors were formed, and a projecting or scanning device may be specifically configured to direct points or patterns of light to a selected region or sector in a selected or concentrated manner. For example, where a depth image is generated based on first depth imaging data derived from reflections of a plurality of points of light that are generally projected onto a scene, e.g., according to a raster pattern, second depth imaging data derived from the same number of points of light that are instead specifically targeted to a certain portion of the scene may be used to update the depth image accordingly. Because the same number of points of light are projected upon the selected region or sector, evaluating reflections of such light from the region or sector does not overburden an imaging device, or overwhelm the bandwidth, processing power, storage capacity or other resources of the imaging device, yet provides detailed depth information regarding background or foreground objects within the region or sector. The imaging device may be reconfigured to direct points or patterns of light to each of a plurality of regions or sectors of a scene thereafter, as desired, until a complete or sufficiently detailed model of the scene is obtained. The scene may be continually evaluated using visual sensors or depth sensors to determine whether contents of the scene have changed, and definitions of the various regions or sectors of the scene may be updated accordingly.

Referring to FIGS. 1A through 1H, a system 100 including an imaging device 110 for capturing imaging data from a scene (or environment) 130 is shown. As is shown in FIG. 1A, the imaging device 110 is aligned to capture imaging data, including visual imaging data and depth imaging data, from the scene 130. As is also shown in FIG. 1A, the scene 130 includes a plurality of foreground objects 140 (e.g., a child) and a plurality of background objects 150 (e.g., walls, doors or other structures).

Figure 1B:
Figure 1C:
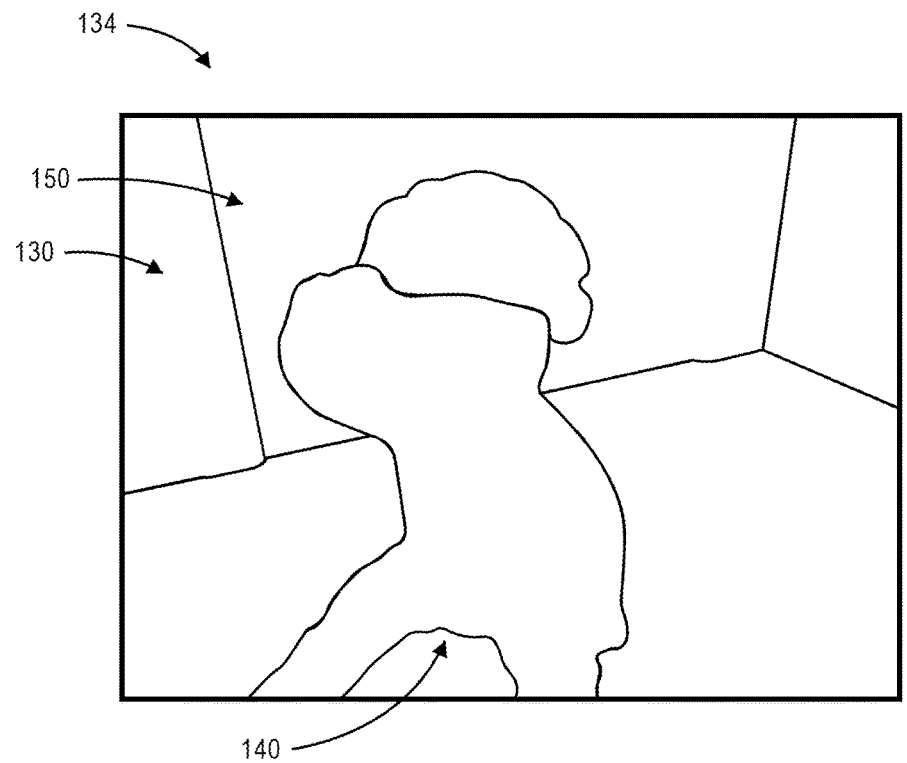

As is shown in FIGS. 1B and 1C, a visual image 132 captured from the scene 130 by the imaging device 110 is shown. The visual image 132 includes the foreground objects 140 and the background objects 150 within the scene 130. Imaging data, such as the visual image 132, may be processed in order to recognize one or more attributes of objects or other features present within a scene, including but not limited to any edges, contours, outlines, colors, textures, silhouettes, shapes or other characteristics of the foreground objects 140 or the background objects 150 within the scene 130. An outline 134 of the foreground objects 140 and the background objects 150 within the scene 130 may be derived by processing the visual image 132 according to any known detection or classification algorithms or techniques.

Figure 1D:
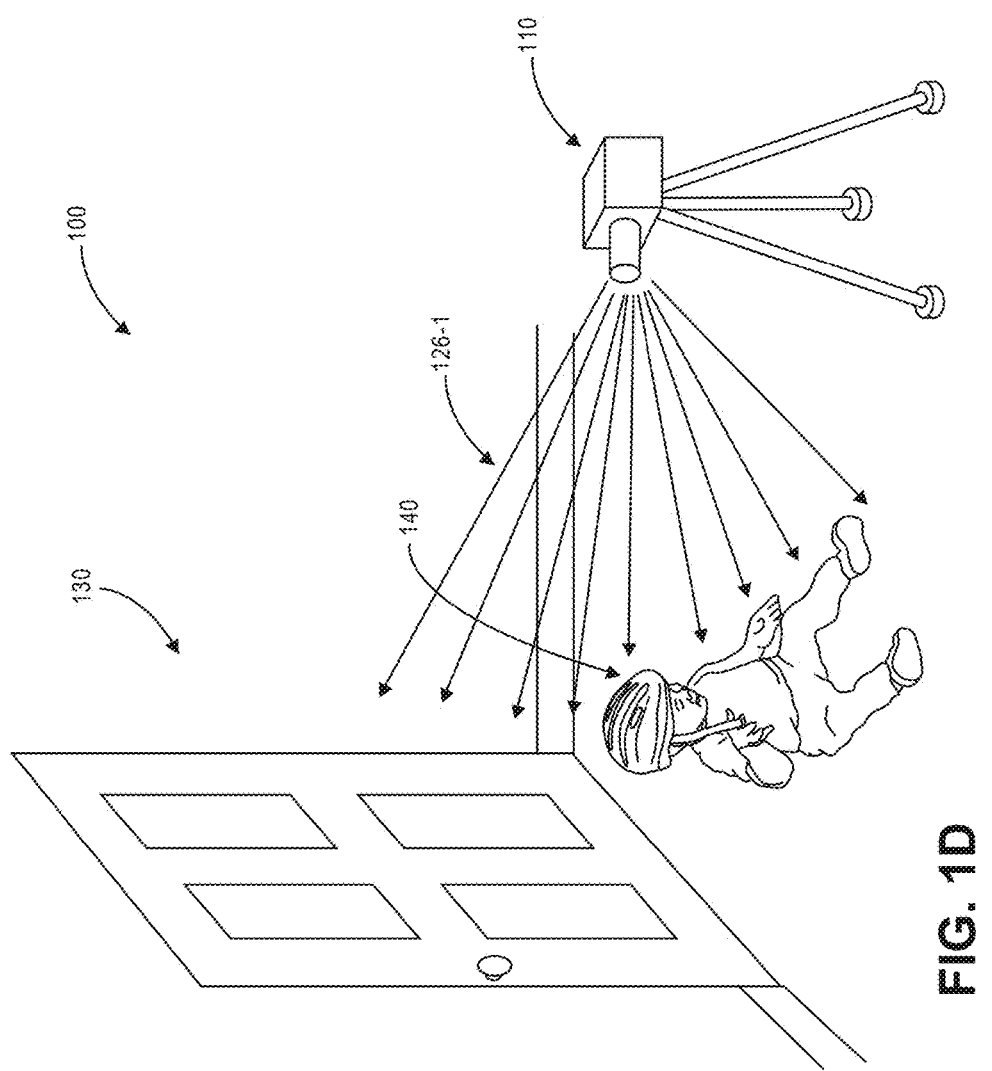

As is discussed above, a depth image may be obtained from an environment or scene according to any number of methods by projecting points or patterns of light onto objects within the scene, and capturing and interpreting the reflected points or patterns, e.g., using one or more structured-light or time-of-flight sensors or other imaging devices. As is shown in FIG. 1D, the imaging device 110 may be configured to project a plurality of points 126-1 of light, or a pattern of such points, from a projector onto the foreground objects 140 or the background objects 150 of the scene 130. Preferably, the points 126-1 of light that are projected are within the infrared range, e.g., approximately 700 to 1000 nanometers in wavelength, or slightly beyond the visible spectrum.

Figure 1E:
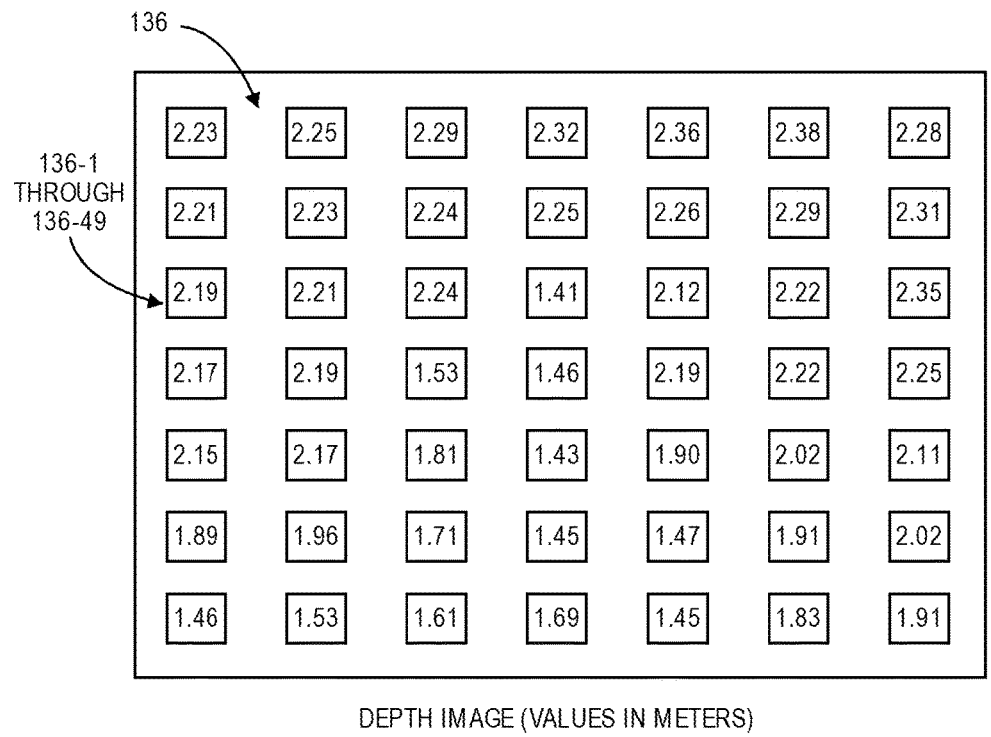

A depth image 136 may be derived based on reflections of the plurality of points 126-1 of light from the foreground objects 140 and/or the background objects 150 of the scene 130. As is shown in FIG. 1E, the depth image 136 includes a plurality of depth values 136-1 through 136-49 derived from the reflections of the points 126-1 of light. Each of the depth values 136-1 through 136-49 corresponds to a distance (in meters) between a depth sensor of the imaging device 110 and one or more aspects of the scene 130, including but not limited to one of the foreground objects 140 or the background objects 150. The visual image 132 and the depth image 136 may be stored in association with one another, or independently, in one or more data stores, e.g., one or more data storage or memory components provided in the imaging device 110, or in one or more alternate or virtual locations, e.g., in a "cloud"-based system.

Figure 1F:
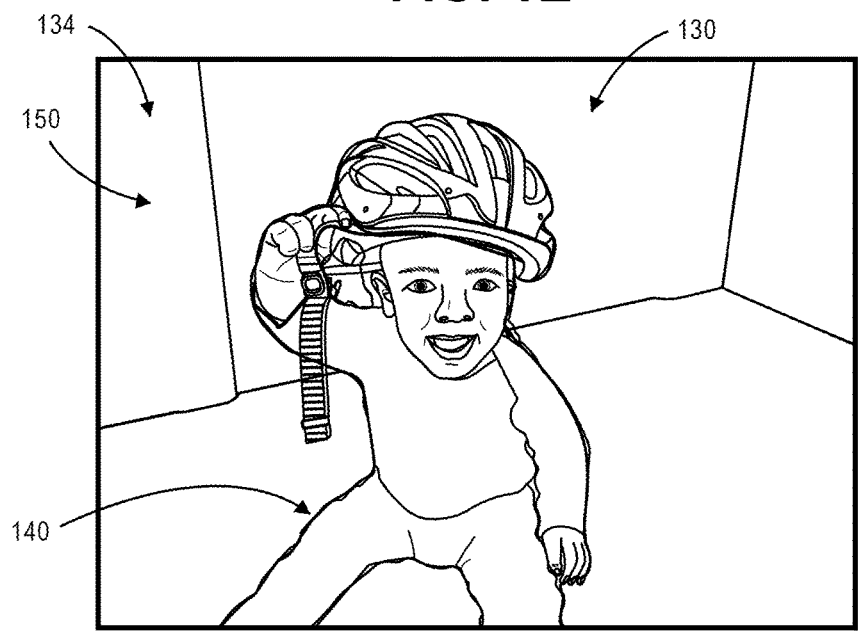

Based on the visual image 132 and the depth image 136 captured from the scene 130, one or more regions or sectors of the scene 130 may be selected for enhanced depth evaluation. For example, as is shown in FIG. 1F, the foreground objects 140 (e.g., aspects corresponding to the child, including facial features, other skin surfaces, or articles of clothing of the child) may be selected based on any variation of the depths or ranges to the foreground objects 140, or on any variations in color, texture or other attributes. As another example, the imaging device 110 may identify edges, contours, outlines, colors, textures, silhouettes, shapes or other characteristics of objects, or portions of objects, expressed in still or moving digital images and may select regions or sectors of the scene 130 corresponding to such characteristics, in order to further refine the depth resolution of such characteristics. Alternatively, the imaging device 110 may be configured to search for and recognize specific objects or classes of objects, and one or more regions or sectors of the scene 130 may be recognized as corresponding to the specific object or class of objects based on the visual image 132 or the depth image 136. Additionally, the region or sector of the scene 130 corresponding to the foreground objects 140 may be selected for evaluation in its entirety or, alternatively, one or more subregions or subsectors of the region or sector may be selected.

Figure 1G:
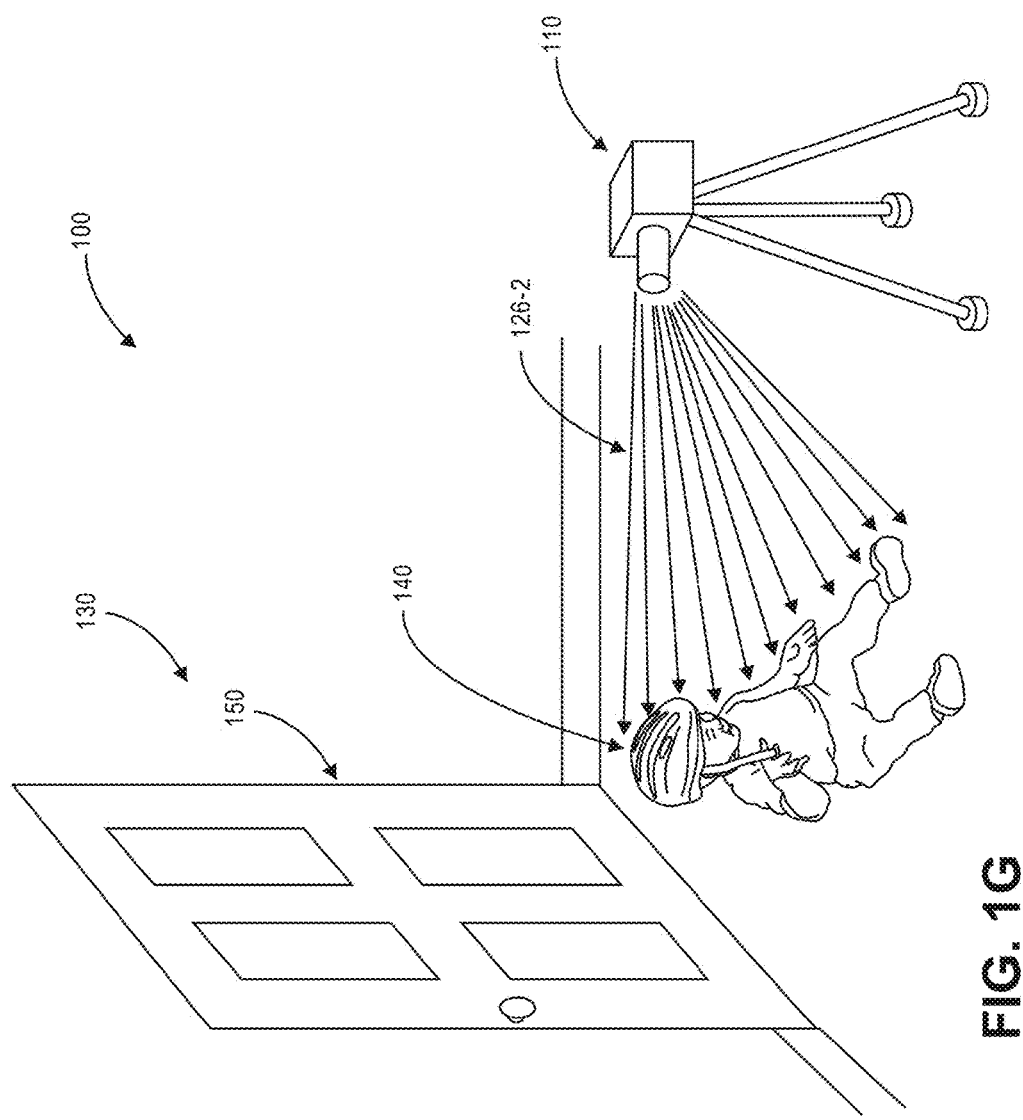
Figure 1H:
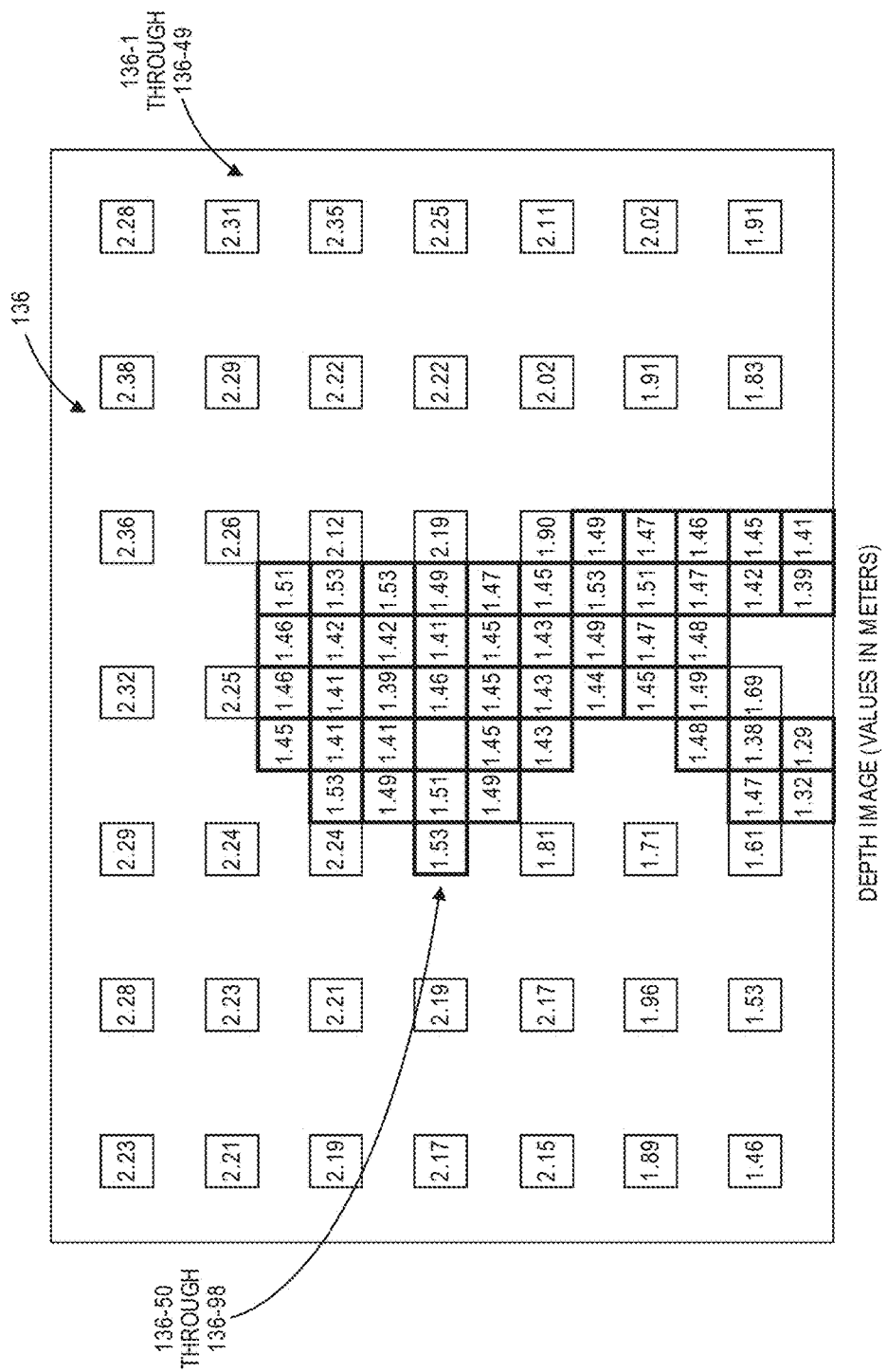

As is shown in FIG. 1G, after the region or sector corresponding to the foreground objects 140 has been selected for obtaining an enhanced depth evaluation, the imaging device 110 may be configured to project another plurality of points 126-2 of light, or a pattern of such points, directly onto the foreground objects 140. As is shown in FIG. 1H, based on reflections of the plurality of points 126-2 of light from the foreground objects 140, the depth image 136 may be updated to include not only the depth values 136-1 through 136-49 derived from the reflections of the points 126-1 of light from the scene 130 as a whole but also a plurality of depth values 136-50 through 136-98 derived from the reflections of the points 126-2 of light from the foreground objects 140. Each of the depth values 136-50 through 136-98 corresponds to a distance (in meters) between the depth sensor of the imaging device 110 and one or more aspects of the foreground objects 140, thereby enhancing the level of detail with which depths or ranges to the foreground objects 140 is represented within the depth image 136. Moreover, because the points 126-2 of light projected upon the foreground objects 140 as shown in FIG. 1G are equal in number to the points 126-1 of light initially projected upon the foreground object as shown in FIG. 1D, capturing and interpreting the reflected points 126-2 does not require any greater bandwidth, processing power or storage capacity than that which was required to capture and interpret the points 126-1.

Once the depth values 136-50 through 136-98 corresponding to the foreground objects 140 are determined from the captured and interpreted points 126-2 of light, another plurality of points of light may be projected upon other aspects of the scene 130, e.g., one or more background objects 150, and captured and interpreted in order to update the depth image 136, as necessary, until the depth image 136 adequately reflects depths or ranges to the scene 130 with sufficient detail.

Accordingly, the systems and methods of the present disclosure may be used to generate detailed and accurate depth models or profiles of objects, or ranges to such objects. By selectively projecting points of light, or patterns of such points, onto aspects of a scene that includes background objects, foreground objects, or any other features, the generation of such models, profiles or ranges may be targeted to specific regions or sectors of the scene having high degrees of entropy, e.g., significant variations in depth, color, texture, curvature or other attributes, while regions or sectors of the scene having low degrees of entropy may be deemphasized accordingly. For example, in some embodiments, regions or sectors of a scene having a high number of points of geometric inflection, or a high density of such points, may be sampled at high rates or at high frequencies, while regions or sectors of the scene having a low number of such points, or a low density of such points, may be sampled at low rates or at low frequencies. Instead of effectively "wasting" points of light on regions or sectors of a scene that do not have significant depth variation or are not essential, the systems and methods of the present disclosure may redirect such points toward regions or sectors that do have significant depth variation, or are essential. Adaptively projecting points of light upon specific regions or sectors, or away from other regions or sectors, enables depth models or profiles of objects, or ranges to such objects, to be generated efficiently and without requiring increased bandwidth, processing power, storage capacities or other resources.

Imaging data in the form of visual imaging data, or depth imaging data, may be captured using one or more imaging devices such as digital cameras, depth sensors or range cameras. Such devices may generally operate by capturing light that is reflected from objects, and by subsequently calculating or assigning one or more quantitative values to aspects of the reflected light, e.g., pixels, generating an output based on such values, and storing such values in one or more data stores. Digital cameras may include one or more sensors having one or more filters associated therewith, and such sensors may detect information regarding aspects of any number of pixels of the reflected light corresponding to one or more base colors (e.g., red, green or blue) of the reflected light, or distances to objects from which the light was reflected. Such sensors may generate data files including such information, e.g., visual images and/or depth images, and store such data files in one or more onboard or accessible data stores (e.g., a hard drive or other like component), as well as one or more removable data stores (e.g., flash memory devices), or displayed on one or more broadcast or closed-circuit television networks, or over a computer network as the Internet.

A visual image is a collection of pixels, typically arranged in an array, which defines an optically formed reproduction of one or more objects, backgrounds or other features of a scene and may be stored in a data file. In a visual image, each of the pixels represents or identifies a color or other light condition associated with a portion of such objects, backgrounds or features. For example, a black-and-white image includes a single bit for representing a light condition of the pixel in a binary fashion (e.g., either black or white), while a grayscale image may represent the light condition in multiple bits (e.g., two to eight bits for defining tones of gray in terms of percentages or shares of black-and-white), and a color image may include groups of bits corresponding to each of a plurality of base colors (e.g., red, green or blue), and the groups of bits may collectively represent a color associated with the pixel. A depth image, or a depth map, is also a collection of pixels that defines an optically formed reproduction of one or more objects, backgrounds or other features of a scene, and may also be stored in a data file. Unlike the pixels of a visual image, however, each of the pixels of a depth image represents or identifies not a light condition or color of such objects, backgrounds or features, but a distance to objects, backgrounds or features. For example, a pixel of a depth image may represent a distance between a sensor of an imaging device that captured the depth image (e.g., a depth camera or range sensor) and the respective object, background or feature to which the pixel corresponds.

Imaging data files that are stored in one or more data stores may be printed onto paper, presented on one or more computer displays, or subjected to one or more analyses, such as to identify items expressed therein. Such data files may be stored in any number of formats, including but not limited to .JPEG or .JPG files, or Graphics Interchange Format (or ".GIF"), Bitmap (or ".BMP"), Portable Network Graphics (or ".PNG"), Tagged Image File Format (or ".TIFF") files, Audio Video Interleave (or ".AVI"), Quick-Time (or ".MOV"), Moving Picture Experts Group (or ".MPG," ".MPEG" or ".MP4") or Windows Media Video (or ".WMV") files.

Reflected light may be captured or detected by an imaging device if the reflected light is within the device's field of view, which is defined as a function of a distance between a sensor and a lens within the device, viz., a focal length, as well as a location of the device and an angular orientation of the device's lens. Accordingly, where an object appears within a depth of field, or a distance within the field of view where the clarity and focus is sufficiently sharp, an imaging device may capture light that is reflected off objects of any kind to a sufficiently high degree of resolution using one or more sensors thereof, and store information regarding the reflected light in one or more data files.

Many imaging devices also include manual or automatic features for modifying their respective fields of view or orientations. For example, a digital camera may be configured in a fixed position, or with a fixed focal length (e.g., fixed-focus lenses) or angular orientation. Alternatively, an imaging device may include one or more actuated or motorized features for adjusting a position of the imaging device, or for adjusting either the focal length (e.g., zooming the imaging device) or the angular orientation (e.g., the roll angle, the pitch angle or the yaw angle), by causing a change in the distance between the sensor and the lens (e.g., optical zoom lenses or digital zoom lenses), a change in the location of the imaging device, or a change in one or more of the angles defining the angular orientation.

For example, an imaging device may be hard-mounted to a support or mounting that maintains the device in a fixed configuration or angle with respect to one, two or three axes. Alternatively, however, an imaging device may be provided with one or more motors and/or controllers for manually or automatically operating one or more of the components, or for reorienting the axis or direction of the device, i.e., by panning or tilting the device. Panning an imaging device may cause a rotation within a horizontal plane or about a vertical axis (e.g., a yaw), while tilting an imaging device may cause a rotation within a vertical plane or about a horizontal axis (e.g., a pitch). Additionally, an imaging device may be rolled, or rotated about its axis of rotation, and within a plane that is perpendicular to the axis of rotation and substantially parallel to a field of view of the device.

Some modern imaging devices may digitally or electronically adjust an image identified in a field of view, subject to one or more physical and operational constraints. For example, a digital camera may virtually stretch or condense the pixels of an image in order to focus or broaden the field of view of the digital camera, and also translate one or more portions of images within the field of view. Imaging devices having optically adjustable focal lengths or axes of orientation are commonly referred to as pan-tilt-zoom (or "PTZ") imaging devices, while imaging devices having digitally or electronically adjustable zooming or translating features are commonly referred to as electronic PTZ (or "ePTZ") imaging devices.

Information and/or data regarding features or objects expressed in imaging data, including colors, textures or outlines of the features or objects, may be extracted from the data in any number of ways. For example, colors of pixels, or of groups of pixels, in a visual image may be determined and quantified according to one or more standards, e.g., the RGB ("red-green-blue") color model, in which the portions of red, green or blue in a pixel are expressed in three corresponding numbers ranging from 0 to 255 in value. Colors may also be expressed according to a six-character hexadecimal model, or #NNNNNN, where each of the characters N has a range of sixteen digits (i.e., the numbers 0 through 9 and letters A through F). The first two characters NN of the hexadecimal model refer to the portion of red contained in the color, while the second two characters NN refer to the portion of green contained in the color, and the third two characters NN refer to the portion of blue contained in the color. For example, the colors white and black are expressed according to the RGB color model as (255, 255, 255) and (0, 0, 0), respectively, and according to the hexadecimal model as #FFFFFF and #000000, respectively. The color national flag blue is expressed according to the RGB color model as (0, 33, 71), and according to the hexadecimal model as #002147. Any means or model for quantifying a color or color schema within an image or photograph may be utilized in accordance with the present disclosure. Moreover, textures or features of objects expressed in a visual image may be identified using one or more computer-based methods, such as by identifying changes in intensities within regions or sectors of the image, or by defining areas of an image corresponding to specific surfaces.

Furthermore, edges, contours, outlines, colors, textures, silhouettes, shapes or other characteristics of objects, or portions of objects, expressed in still or moving digital images may be identified using one or more algorithms or machine-learning tools. The objects or portions of objects may be stationary or in motion, and may be identified at single, finite periods of time, or over one or more periods or durations. Such algorithms or tools may be directed to recognizing and marking transitions (e.g., the edges, contours, outlines, colors, textures, silhouettes, shapes or other characteristics of objects or portions thereof) within the digital images as closely as possible, and in a manner that minimizes noise and disruptions, and does not create false transitions. Some detection algorithms or techniques that may be utilized in order to recognize characteristics of objects or portions thereof in digital images in accordance with the present disclosure include, but are not limited to, Canny edge detectors or algorithms; Sobel operators, algorithms or filters; Kayyali operators; Roberts edge detection algorithms; Prewitt operators; Frei-Chen methods; or any other algorithms or techniques that may be known to those of ordinary skill in the pertinent arts.

Presently, three-dimensional models of objects, e.g., depth models or depth profiles of such objects, are typically formed from 3D point clouds generated from data captured using depth sensors, range cameras, or other imaging devices. A point cloud defines points of surfaces of an object in coordinate space, and forms a plurality of polygons (e.g., triangles) corresponding to aspects of the surfaces of the object. Computer-based processes for generating point clouds of objects, or for mapping or patching texture-based imagery onto such point clouds, typically consume substantial amounts of computer resources, and are yet subject to seemingly insurmountable barriers of performance and precision, as depth images or other point samples of any density typically do not represent or embody an object's shape at its sharpest points, e.g., corners or edges, or accurately reflect regions of high curvature.

In particular, where a depth model is formed from techniques which utilize the projection of points of light onto surfaces of objects within a scene, or patterns of such points of light, without regard to the contents of the scene (e.g., according to a raster pattern or other regular distribution of the points of light, or a random distribution or density), points that are projected upon surfaces of a scene that feature little variation or entropy do not substantially improve either the accuracy or precision of a depth model, a depth profile, or ranges to objects within a scene that are determined thereby, and unnecessarily consume bandwidth, processing power or storage capacities. Conversely, surfaces of the scene that feature significant variation or entropy are not adequately represented when such surfaces are only subjected to points of a raster pattern, or a regular distribution. Treating such surfaces equally from a perspective of depth evaluation is unhelpful when such surfaces are not, in fact, equally relevant.

The systems and methods of the present disclosure are directed to adaptively generating depth models or depth profiles of scenes, or ranges to objects within such scenes. The systems and methods disclosed herein determine the contents of such scenes, e.g., based on visual images or depth images captured from such scenes, and identify portions of such contents for which an enhanced depth evaluation is required or desired, and portions of such contents for which an enhanced depth evaluation is neither required nor desired. For example, based on a visual image (e.g., a color image, a grayscale image, or a black-and-white image) captured from a scene, or a depth image obtained by any range imaging method, regions or sectors of the scene that include objects of interest, or surfaces having significant variations in depth, color, texture, curvature or other attributes, may be identified. Likewise, regions or sectors of the scene that include objects that are not of interest, or surfaces having insignificant variations in depth, color, texture, curvature or other attributes, may also be identified.

Subsequently, a projector or other source of light may be configured to target regions or sectors of interest, or regions or sectors having significantly varying surfaces, with points of light or patterns of such points, or to increase the number or density of points of light projected upon such regions or sectors. Conversely, the projector or other source of light may be configured to avoid regions or sectors that are not of interest, or that have insignificantly varying surfaces, or to decrease the number or density of points of light projected upon such regions or sectors. The regions or sectors that are targeted or avoided may be determined by a ranking or priority system that considers the relative importance of such regions or sectors, or the relative certainty or uncertainty of knowledge regarding the variability of their respective surfaces, in determining where greater or fewer numbers of points of light may be projected accordingly. Thus, a more detailed or enhanced accounting of the contents of regions or sectors of a scene may be obtained without increasing a total number of points of light that are projected, captured or interpreted, without requiring any greater amounts of bandwidth, processing power or storage capacity.

In some embodiments, a plurality of points of light, or a pattern of such points, may be projected upon a scene using one or more imaging devices, e.g., projectors or scanners of infrared and/or laser light. Thereafter, visual imaging data (e.g., one or more color images) and depth imaging data (e.g., one or more depth images) may be captured from the scene by the one or more imaging devices. Using such data, the scene may be subjected to one or more registration techniques, pursuant to which a three-dimensional model of the scene may be generated. Subsequently, one or more algorithms or techniques for recognizing features such as edges, contours, outlines, colors, textures, silhouettes, shapes or other characteristics of objects within imaging data may be performed on the visual imaging data and the depth imaging data, and regions or sectors of the imaging data including any number of aspects of the scene may be recognized, detected and/or tracked accordingly. Based on such recognized, detected and/or tracked objects, the projection of light upon the scene may be modified accordingly, and the process may repeat itself, as necessary, until the three-dimensional model of the scene is sufficiently complete and accurate.

In some embodiments, regions or sectors of a scene, or of a field of view that includes the scene in whole or in part, may be identified from a visual image captured from the scene. For example, any edges, contours, outlines, colors, textures, silhouettes, shapes or other characteristics of the scene, e.g., of one or more background or foreground objects within the scene, may be recognized from a color image and used to make determinations as to which of the regions or sectors of the scene or of the field of view should be subjected to an enhanced depth evaluation. In some other embodiments, such regions or sectors may be identified from a depth image captured from the scene. For example, where a plurality of points of light (e.g., infrared light) are projected upon a surface, and reflections from such points are captured and interpreted, a depth image may be generated thereby. Regions or sectors of the depth image having maximum depth variability (or maximum differences in depth values between adjacent points), or depth variability (or differences in depth values between adjacent points) that exceeds a predetermined threshold may be subsequently sampled by another plurality of points of light, and an enhanced depth evaluation of such regions or sectors may be obtained thereby. Similarly, regions or sectors of the depth image having minimum depth variability (or minimum differences in depth values between adjacent points), or depth variability (or differences in depth values between adjacent points) that fall below a predetermined threshold, need not be sampled again, or may be sampled less frequently than regions or sectors having substantially higher depth variability.

The systems and methods disclosed herein may be used in connection with a variety of range imaging techniques. For example, points or patterns of light may be projected by a specifically configured projector and utilized to determine depths or ranges to surfaces within a scene by structured-light, time-of-flight, or any number of other systems or methods. Structured-light systems operate by actively illuminating a scene with points or patterns of light having varying intensities from a projector or other modulated light source. An imaging sensor is configured to capture reflections of the structured-light illuminations, which are reciprocal to the patterns of the illuminations where the scene consists of a surface that is planar and without any three-dimensional surface variation, but are distorted with respect to such patterns where the surface is not planar or features three-dimensional surface variations. Thus, structured-light systems are able to compute ranges to points on three-dimensional objects within scenes as functions of distances between a projector and an imaging sensor, and angles of orientation of the projector and the imaging sensor with respect to such points. Many techniques for determining depths or ranges to three-dimensional objects using structured-light systems are available. For example, sequential structured-light projection techniques, in which sequences of patterns including stripes having binary or multiple variations in intensity may be projected upon surfaces of objects, in any number of phases, and captured and interpreted in order to determine ranges to such surfaces.

Additionally, time-of-flight systems (e.g., laser scanners or laser rangefinders) typically include a pulsed or modulated light source, e.g., a laser or LED source of infrared light; as well as an optical diffuser to spread emitted light onto a scene; a collection lens for gathering light that is back-reflected by portions of the scene; and a depth sensor (or range sensor) having an array of image pixels or detectors that are configured to measure times of flight required by light pulses to travel from the light source to a portion of the scene and back to the depth sensor. Such systems may further include one or more filters, sensor interfaces, power sources or the like.

Any number of other range imaging devices or techniques may be utilized in accordance with the present disclosure. For example, stereo triangulation may be used to determine depth information using visual imaging data captured using two or more imaging devices in different positions. Based on intersections of lines of sight to common objects or points within each of the images, e.g., triangulation, three-dimensional location information of the common objects or points may be determined.

Figure 2:
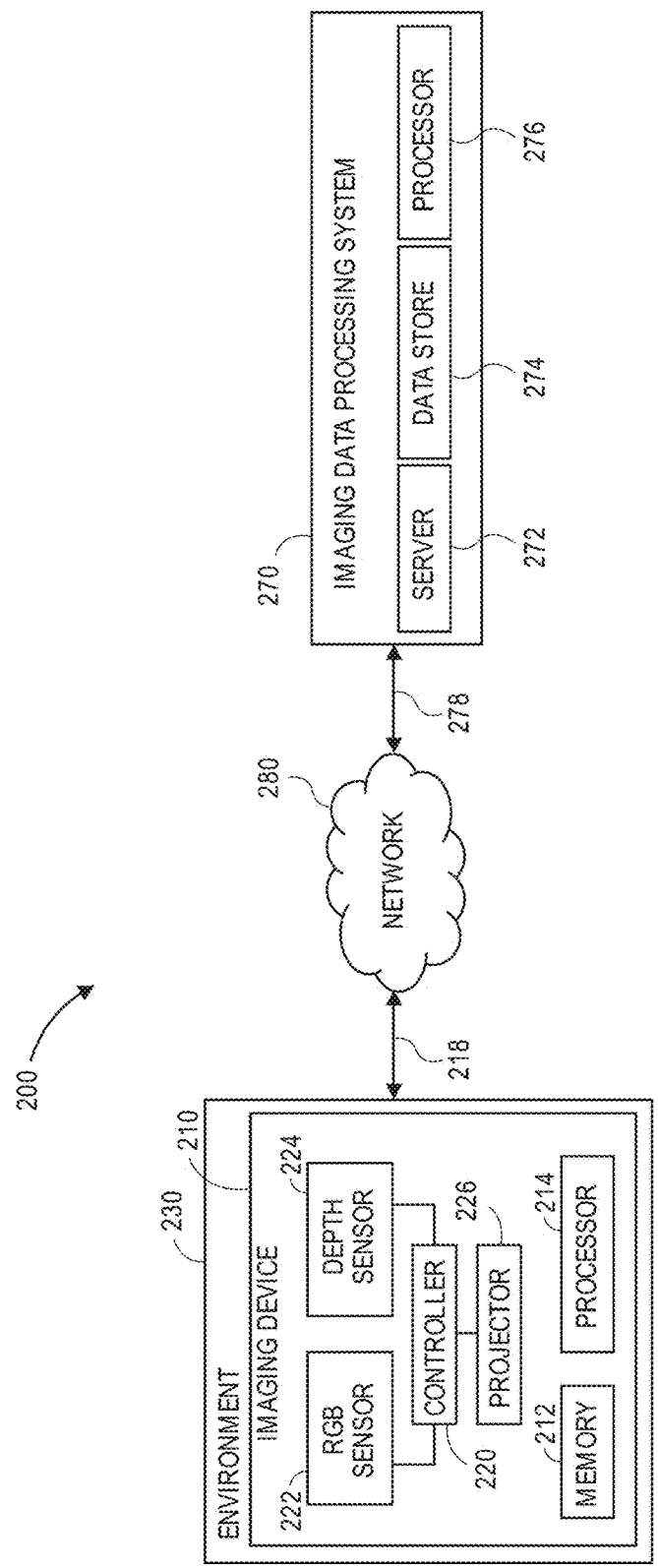
FIG. 2 is a block diagram of components of one system for depth sensing in accordance with embodiments of the present disclosure.

Referring to FIG. 2, a block diagram of one system 200 for depth sensing in accordance with embodiments of the present disclosure is shown. The system 200 includes an imaging device 210 provided in an environment 230 (or a scene) and an imaging data processing system 270 that are connected to one another across a network 280, such as the Internet. Except where otherwise noted, reference numerals preceded by the number "2" shown in FIG. 2 indicate components or features that are similar to components or features having reference numerals preceded by the number "1" shown in FIGS. 1A through 1H.

The imaging device 210 provided in the environment 230 includes a memory or storage component 212, one or more processors 214, a controller 220, an RGB sensor 222, a depth sensor 224 and a projector 226, along with any other components that may be required in order to capture, analyze and/or store imaging data from within the environment 230 in which the imaging device 210 is provided.

The controller 220 may be any processor-driven hardware component and/or software module configured to control the operation of the imaging device 210. The controller 220 may generate, transmit and/or receive one or more control signals for operating, repositioning or reorienting one or more aspects of the imaging device 210, including but not limited to the RGB sensor 222, the depth sensor 224 and/or the projector 226, or for storing information or data captured by the RGB sensor 222 and/or the depth sensor 224 (e.g., one or more visual images and/or depth images) in one or more data stores, including the memory or storage component 212, or one or more external computer devices or systems, via the network 280. Alternatively, or additionally, the controller 220 may also receive one or more control signals from one or more external computer devices or systems, via the network 280.

The RGB sensor 222 may be a charge-coupled device (or "CCD"), a complementary metal-oxide-semiconductor (or "CMOS"), an N-type metal-oxide-semiconductor (or "NMOS"), or any other photosensitive surface having a plurality of pixel sensors that may be exposed to visible or invisible light and processed according to any shuttering method (e.g., rolling shuttering, global shuttering, or a hybrid shuttering method), for the purpose of generating a visual image thereby. Likewise, the depth sensor 224 may be any photosensitive surface (e.g., a monochromatic CMOS sensor) that may be exposed to visible or invisible light and processed according to any shuttering method, for the purpose of generating a depth image thereby. The RGB sensor 222 and the depth sensor 224 may each define a field of view to any angular extent, e.g., horizontally, vertically, or both horizontally or vertically. Alternatively, or in addition to the RGB sensor 222 and the depth sensor 224, the imaging device 210 may further include one or more grayscale and/or black-and-white sensors.

The projector 226 may be any form of light projection system (e.g., an infrared light projector) or light source that may be configured to direct points of light (or patterns of such points) onto surfaces within the environment 230, for reflection and capture by the depth sensor 224. In some embodiments, the projector 226 may be configured to project points of light having wavelengths within a range of approximately 700 to 1000 nanometers, e.g., slightly beyond the visible spectrum, or patterns of such points in a constant or variable output. In some embodiments, the projector 226 is configured to project class 1 lasers. The projector 226 may have any suitable operating range, and may be programmed to direct such points of light (or patterns of such points) to any angular extent within the operating range.

The imaging device 210 may be any type or form of optical recording sensor or device that may be used to photograph or otherwise record information or data (e.g., still or moving images captured at any frame rates) of any kind or for any purpose regarding operations or activities occurring within one or more areas or regions of the environment 230. For example, in some embodiments, the imaging device 210 may be or comprise a red, green, blue ("RGB") color camera, a still camera, a motion capture/video camera or any other type or form of camera. In other embodiments, the imaging device 210 may be or comprise a depth-sensing camera, such as an RGBz (or RGBD) camera. In still other embodiments, the imaging device 210 may be or comprise a thermographic or infrared (IR) camera. Additionally, in some embodiments, the imaging device 210 may simply be or comprise a camera module including a lens and an image sensor configured to convert an optical image obtained by the lens of the camera into a digital signal or digital representation of the image, including image resolutions of varying degrees that may be captured and stored at various rates (e.g., frames per second).

The imaging device 210 may also capture one or more still or moving images, along with any relevant audio signals or other information, and may also connect to or otherwise communicate with one or more other components, or with the network 280, as indicated by line 218, through the sending and receiving of digital data. Although the system 200 shown in FIG. 2 includes a single imaging device 210, provided in a single environment 230, any number or type of imaging devices or sensors may be provided within any number of environments in accordance with the present disclosure. Alternatively, the system 200 may further include any number of other types of imaging devices or sensors, including but not limited to laser scanners or laser rangefinders.

The environment 230 may be any scene or location, or any number of scenes or locations, within which one or more imaging devices 210 may be provided for capturing imaging data (e.g., visual imaging data and/or depth imaging data) regarding objects or activities occurring therein, e.g., either foreground objects or background objects. According to one embodiment, the environment 230 may be a fulfillment center, a warehouse or other like facility; a financial institution, such as a bank or trading floor; a transportation hub or station, such as an airport, a train station or a bus station; or a stadium, a theater, a shopping center or another large-scale venue; or portions thereof.

According to some other embodiments, the environment 230 may further include one or more order processing and/or communication systems using computer devices in communication with one or more of the imaging device 210, the imaging data processing system 270, or through one or more other computing devices or machines that may be connected to the network 280, in order to transmit or receive information in the form of digital or analog data, or for any other purpose. Such computer devices may be general purpose devices or machines, or dedicated devices or machines that feature any form of input and/or output peripherals such as scanners, readers, keyboards, keypads, touchscreens or like devices, and may further operate or provide access to one or more engines for analyzing the information or data regarding operations or activities occurring within the environment 230.

Moreover, the environment 230 may further include one or more control systems that may generate instructions for conducting operations therein. For example, such control systems may be associated with one or more other computing devices or machines, and may communicate with the imaging device 210, the imaging data processing system 270 or one or more other computer devices (not shown) over the network 280, through the sending and receiving of digital data. Those of ordinary skill in the pertinent art will recognize that the systems and methods of the present disclosure are not limited by any activities that may be performed or functions that may be provided by or within the environment 230 in which the imaging device 210 is provided.

The imaging data processing system 270 of FIG. 2 may include one or more physical computer servers 272 having a plurality of data stores 274 (or databases) associated therewith, as well as one or more computer processors 276 provided for any specific or general purpose. For example, the imaging data processing system 270 of FIG. 2 may be independently provided for the exclusive purpose of managing the monitoring of video files or other imaging data captured by the imaging device 210 or, alternatively, provided in connection with one or more physical or virtual services configured to manage or monitor such files, as well as one or more other functions. The servers 272 may be connected to or otherwise communicate with the data stores 274 and the processors 276. The data stores 274 may store any type of information or data, including digital media files or any like files containing multimedia (e.g., audio and/or video content), for any purpose. The servers 272 and/or the computer processors 276 may also connect to or otherwise communicate with the network 280, as indicated by line 278, through the sending and receiving of digital data. For example, the imaging data processing system 270 may be any facility, station or location having the ability or capacity to receive and store information or data, such as digital media files, in one or more data stores, e.g., digital media files received from the imaging device 210, or from one another, or from one or more other external computer systems (not shown) via the network 280.

The network 280 may be any wired network, wireless network, or combination thereof, and may comprise the Internet in whole or in part. In addition, the network 280 may be a personal area network, local area network, wide area network, cable network, satellite network, cellular telephone network, or combination thereof. The network 280 may also be a publicly accessible network of linked networks, possibly operated by various distinct parties, such as the Internet. In some embodiments, the network 280 may be a private or semi-private network, such as a corporate or university intranet. The network 280 may include one or more wireless networks, such as a Global System for Mobile Communications (GSM) network, a Code Division Multiple Access (CDMA) network, a Long Term Evolution (LTE) network, or some other type of wireless network. Protocols and components for communicating via the Internet or any of the other aforementioned types of communication networks are well known to those skilled in the art of computer communications and thus, need not be described in more detail herein.

The computers, servers, devices and the like described herein have the necessary electronics, software, memory, storage, databases, firmware, logic/state machines, microprocessors, communication links, displays or other visual or audio user interfaces, printing devices, and any other input/output interfaces to provide any of the functions or services described herein and/or achieve the results described herein. Also, those of ordinary skill in the pertinent art will recognize that users of such computers, servers, devices and the like may operate a keyboard, keypad, mouse, stylus, touch screen, or other device (not shown) or method to interact with the computers, servers, devices and the like, or to "select" an item, link, node, hub or any other aspect of the present disclosure.

The imaging device 210 or the imaging data processing system 270 may use any web-enabled or Internet applications or features, or any other client-server applications or features including E-mail or other messaging techniques, to connect to the network 280, or to communicate with one another, such as through short or multimedia messaging service (SMS or MMS) text messages. For example, the imaging device 210 may be adapted to transmit information or data in the form of synchronous or asynchronous messages to the imaging data processing system 270 or to any other computer device in real time or in near-real time, or in one or more offline processes, via the network 280. Those of ordinary skill in the pertinent art would recognize that the imaging device 210 or the imaging data processing system 270 may operate any of a number of computing devices that are capable of communicating over the network, including but not limited to set-top boxes, personal digital assistants, digital media players, web pads, laptop computers, desktop computers, electronic book readers, and the like. The protocols and components for providing communication between such devices are well known to those skilled in the art of computer communications and need not be described in more detail herein.

The data and/or computer executable instructions, programs, firmware, software and the like (also referred to herein as "computer executable" components) described herein may be stored on a computer-readable medium that is within or accessible by computers or computer components such as the memory or storage component 212, the processors 214, the controller 220, the server 272, the processor 276, or to any other computers or control systems utilized by the imaging device 210 or the imaging data processing system 270, or within the environment 230, and having sequences of instructions which, when executed by a processor (e.g., a central processing unit, or "CPU"), cause the processor to perform all or a portion of the functions, services and/or methods described herein. Such computer executable instructions, programs, software and the like may be loaded into the memory of one or more computers using a drive mechanism associated with the computer readable medium, such as a floppy drive, CD-ROM drive, DVD-ROM drive, network interface, or the like, or via external connections.

Some embodiments of the systems and methods of the present disclosure may also be provided as a computer-executable program product including a non-transitory machine-readable storage medium having stored thereon instructions (in compressed or uncompressed form) that may be used to program a computer (or other electronic device) to perform processes or methods described herein. The machine-readable storage media of the present disclosure may include, but is not limited to, hard drives, floppy diskettes, optical disks, CD-ROMs, DVDs, ROMs, RAMs, erasable programmable ROMs ("EPROM"), electrically erasable programmable ROMs ("EEPROM"), flash memory, magnetic or optical cards, solid-state memory devices, or other types of media/machine-readable medium that may be suitable for storing electronic instructions. Further, embodiments may also be provided as a computer executable program product that includes a transitory machine-readable signal (in compressed or uncompressed form). Examples of machine-readable signals, whether modulated using a carrier or not, may include, but are not limited to, signals that a computer system or machine hosting or running a computer program can be configured to access, or including signals that may be downloaded through the Internet or other networks.

Figure 3:
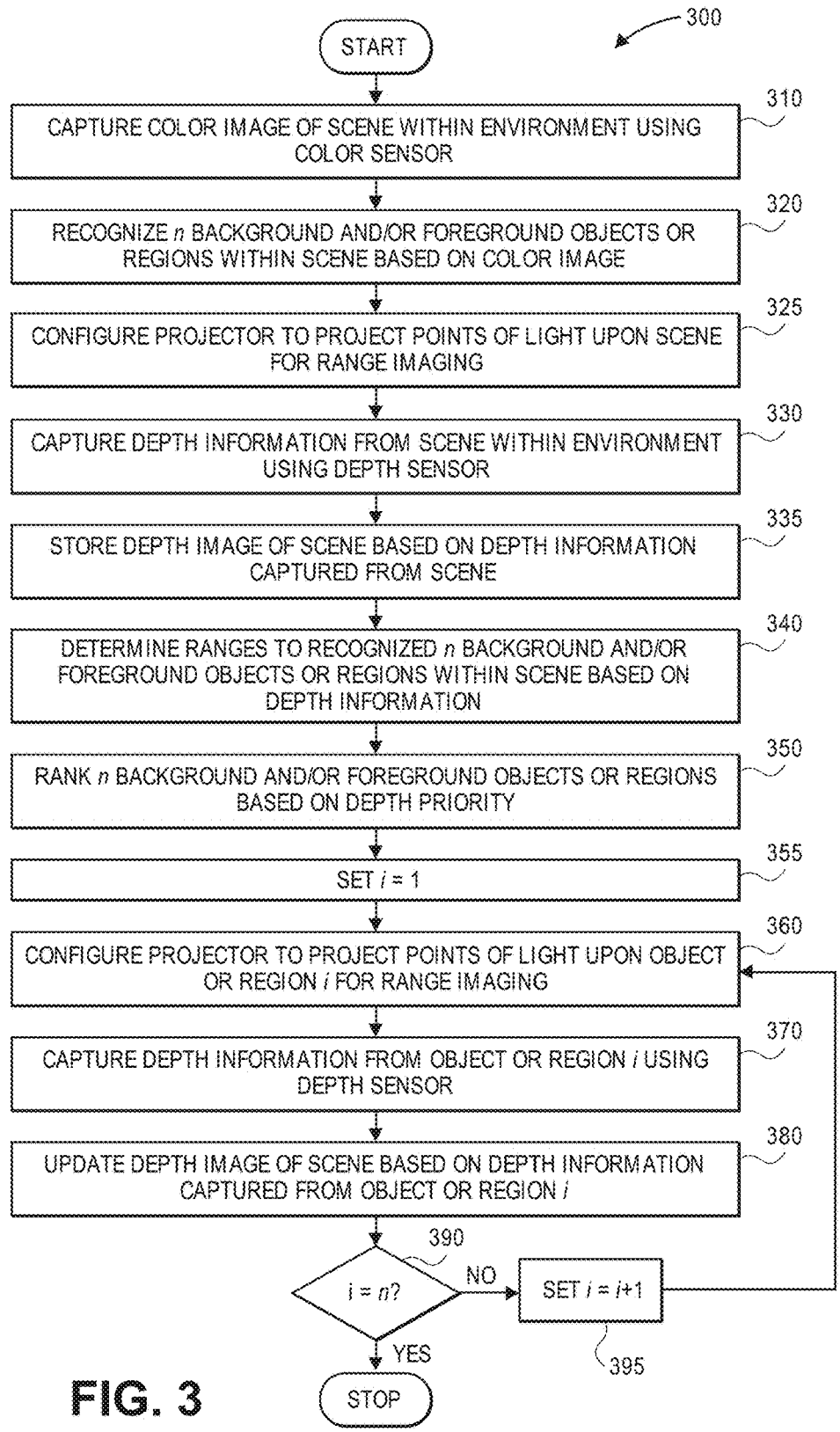
FIG. 3 is a flow chart of one process for depth sensing in accordance with embodiments of the present disclosure.

As is discussed above, the systems and methods of the present disclosure are directed to generating depth profiles or depth models, or determining ranges to objects within a scene, by projecting points of light onto objects or regions of a scene having significant variations in depth, color, texture, curvature or other attributes. Referring to FIG. 3, a flow chart 300 of one process for depth sensing in accordance with embodiments of the present disclosure is shown. At box 310, a color image of a scene within an environment is captured using a color sensor, e.g., an imaging device such as an RGBz camera. At box 320, the color image is interpreted to recognize any background and/or foreground objects or regions within the color image of the scene. For example, the color image may be captured and processed in order to recognize any edges, contours, outlines, colors, textures, silhouettes, shapes or other characteristics of the scene that may be associated with one or more objects. Some such objects may include humans (or faces, limbs or extremities thereof), commercial items, structures, vehicles or other objects within the background or the foreground of the scene.

At box 325, a projector is configured to project points of light upon a scene for range imaging. For example, referring again to FIG. 1D, the imaging device 110 may be programmed to project points of light, or patterns of such light, in an even distribution, e.g., a raster pattern, across the scene. At box 330, depth information is captured from the scene by a depth sensor. In some embodiments, the depth sensor and the color sensor by which the color image was captured at box 310 may be components of the same imaging device, e.g., an RGBz camera. In other embodiments, the color sensor and the depth sensor may be provided in discrete imaging devices, each aligned to capture imaging data from substantially common fields of view. The depth information may comprise captured reflections of points or patterns of light projected upon the scene, and such reflections may be interpreted according to structured-light techniques, time-of-flight techniques, or any number of other range imaging techniques. At box 335, a depth image of the scene generated based on the depth information is stored, e.g., in one or more data stores. The depth image may have any level of resolution, and the data stores in which the depth image is stored may be provided in association with an imaging device, or maintained in one or more alternate or virtual locations, e.g., in a "cloud"-based system.

At box 340, ranges to the recognized background and/or foreground objects or regions within the scene are determined based on the depth information. For example, depths or ranges corresponding to portions of the objects or regions recognized at box 320 may be identified within the depth information or from the depth image accordingly. At box 350, a plurality of n objects or regions within the scene are ranked based on the depth information. The objects or regions may be ranked based on any basis, including but not limited to their distances from the depth sensor, any relative variation in depth, color, texture, curvature or other attributes within the objects or regions, any specific colors, outlines or shapes corresponding to the objects or regions, or any other relevant factors. For example, one or more metrics or indices representative of one or more levels of priority for objects or regions, or a scene at large, may be created or derived (e.g., a depth priority index, a color priority index, a texture priority index, a curvature priority index, an object priority index, a surface priority index, a region priority index), and the various aspects of the scene may be ranked according to one or more of such metrics or indices.

Additionally, in some embodiments, objects or regions may be ranked based on what they are or represent. For example, where an object or a region within a scene is identified or classified as a person, that object or region may be ranked at a higher priority level than a vehicle or a non-human animal, e.g., in a facial recognition application. In some embodiments, each of the objects or regions within the scene may be included in the ranking of then objects or regions. In other embodiments, one or more of the objects or regions within the scene may be omitted or overlooked, on any basis or for any reason, from the ranking of the n objects or regions.

At box 355, a value of a variable i is set equal to 1. At box 360, the projector is configured to project points of light upon the object or region i for range imaging. The object or region i may be the highest-ranking or highest-priority object or region within the scene, or the highest-ranking or highest-priority object or region to have yet been evaluated, and the projector may be programmed or otherwise oriented to project points of light or patterns of such points onto that object or region i. Where the projector was used to project points or patterns of light for capturing the depth information at box 330, e.g., generally across the scene, the projector may be reconfigured to project points to the specific object or region i. At box 370, depth information is captured from the object or region i using the depth sensor. The depth information may be derived according to structured-light, time-of-flight or any other range imaging techniques based on reflections of the light projected upon the object or region i, or on any other basis (e.g., stereo triangulation).

At box 380, the depth image is updated based on the depth information captured from the object or region i. For example, where the depth image generated at box 335 is determined based on reflections of light generally projected upon the scene, e.g., according to a raster pattern, the depth image may be updated based on reflections of light projected upon the object or region i alone. Where the number of points previously projected upon the scene as a whole and the number of points projected upon the object or region i are identical, the bandwidth, processing power or storage capacity required in order to determine depths to such points are identical, but result in a greater level of detail regarding depths or ranges to aspects within the object or region i.

At box 390, whether the value of the variable i equals n, i.e., whether the object or region i is the final object or region to be evaluated, is determined. If the value of the variable i equals n, i.e., if the depth image has been updated based on the depth information captured from each of then objects or regions ranked at box 350, the process ends. If the value of the variable i is not equal to n, then the process advances to box 395, where the variable i is incremented by one, i.e., the value of the variable i is set to equal i+1, before returning to box 360, where the projector is directed toward the object or region i for evaluation.

Accordingly, the systems and methods of the present disclosure may be utilized to develop detailed and accurate depth models or depth profiles of scenes, or ranges to objects or regions within such scenes, by adaptively directing points of light, or patterns of such points, to specific objects or regions of such scenes that may be identified on any basis. For example, in some embodiments, objects or regions of a scene having high degrees of entropy in terms of depth, color, texture or curvature variation may be sampled with points of light projected thereon at higher densities or with greater frequencies, while objects or regions having low degrees of entropy in terms of depth, color, texture or curvature variation may be sampled with points of light projected thereon at lower densities or with lower frequencies. In some embodiments, a number or density of geometric inflection points within a scene may be identified based on first or higher-order derivatives (including but not limited to the Hessian matrix) of depth values determined from points of light projected upon the scene. Objects or regions within the scene having high numbers or densities of geometric inflection points may be sampled at high rates or frequencies, while objects or regions within the scene having low numbers or densities of geometric inflection points may be sampled at low rates or frequencies.

In other embodiments, objects or regions of a scene may be sampled with points of light in densities or at frequencies that are selected based on a manner in which such objects or regions are classified. For example, objects or regions that are classified as humans (or specific portions thereof) may be sampled at a first density or first frequency, while objects or regions that are classified as structures, vehicles or other inanimate objects may be sampled at a second density or second frequency. As another example, foreground objects may be sampled at a first density or first frequency, while background objects may be sampled at a second density or second frequency. In this regard, an accurate depth model or depth profile of a scene, or a set of ranges to objects within the scene may be determined in an efficient manner, and without overburdening bandwidth, processing power, storage capacity or other computer-based resources, by projecting points of light or patterns of such points to regions or objects of interest, and with desired densities or frequencies, while avoiding the oversampling of regions or objects within the scene that do not require any further evaluation.

Referring to FIGS. 4A through 4G, views of aspects of one system 400 for depth sensing in accordance with the present disclosure are shown. Except where otherwise noted, reference numerals preceded by the number "4" shown in FIGS. 4A through 4G indicate components or features that are similar to components or features having reference numerals preceded by the number "2" shown in FIG. 2 or by the number "1" shown in FIGS. 1A through 1H.

Figure 4A:
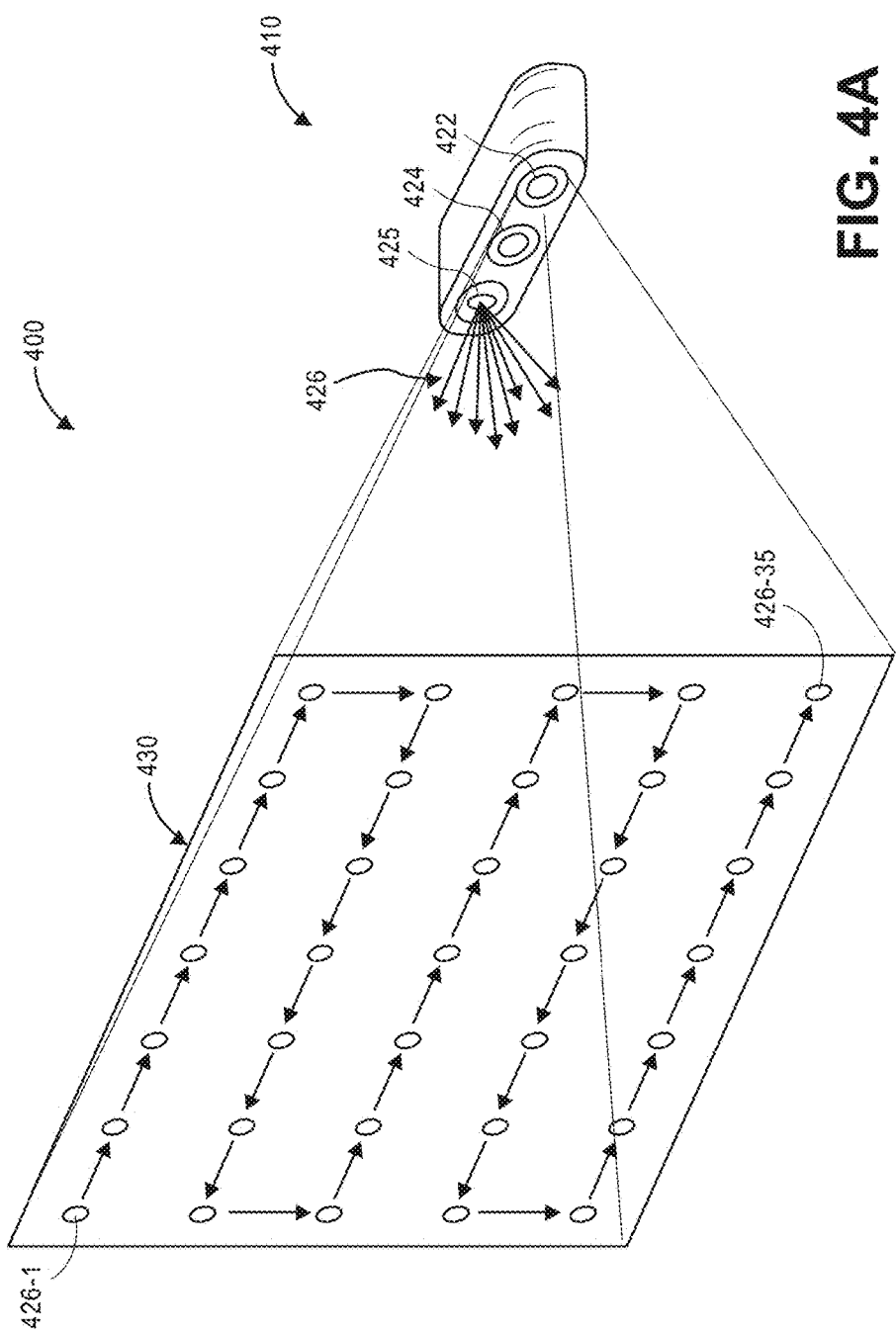
FIGS. 4A through 4G are views of aspects of one system for depth sensing in accordance with embodiments of the present disclosure.

As is shown in FIG. 4A, the system 400 includes an imaging device 410 having a color sensor 422, a depth sensor 424 and a projector 425. The color sensor 422 and the depth sensor 424 are aligned to capture imaging data, e.g., visual imaging data such as color images (or, alternatively, grayscale or black-and-white images) and depth imaging data such as ranging information from a scene 430. In particular, as is shown in FIG. 4A, the projector 425 is programmed to project a plurality of points of light 426-1 through 426-35 onto any objects or regions that are present within the scene 430, e.g., in a raster pattern. The depth sensor 424 is aligned to capture reflections of such points of light 426-1 through 426-35 from any such objects or regions within the scene 430, and to determine distances to such objects or regions based on one or more structured-light or time-of-flight techniques, or any other range imaging techniques.

Figure 4B:
Figure 4C:
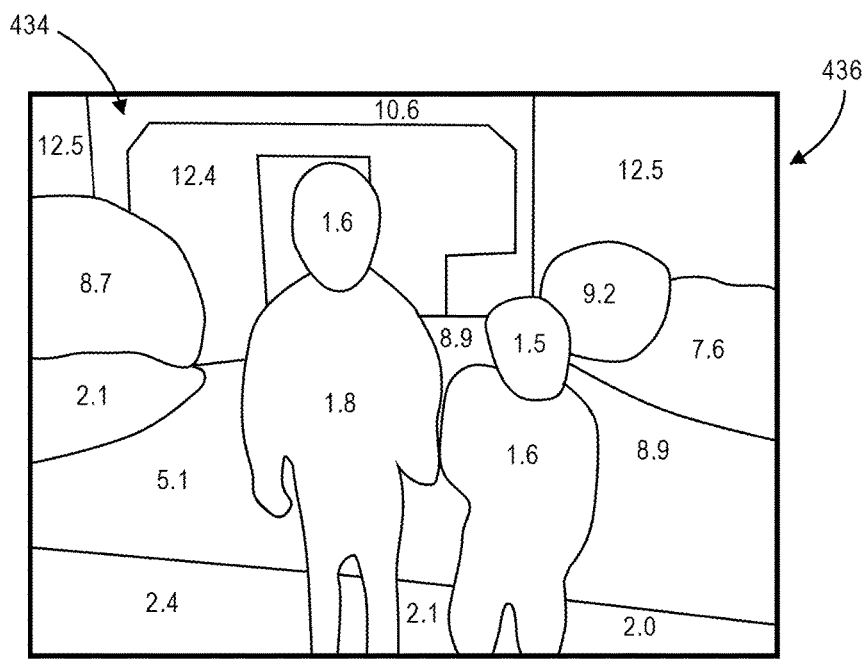

As is shown in FIGS. 4B and 4C, the plurality of points of light 426-1 through 426-35 may be projected in a substantially regular or uniform distribution, e.g., a raster pattern, across the scene 430, and reflections of such points may be captured and interpreted in order to determine ranges to objects or regions within the scene 430. An outline 434 defining a plurality of k sectors corresponding to the objects or regions within the scene may be formed from a color image 432 captured using the color sensor 422, and a depth image 436 may be formed from average depth values determined based on reflections of the points of light 426-1 through 426-35 captured by the depth sensor 424 and assigned to each of the k sectors within the outline 434.

Figure 4D:
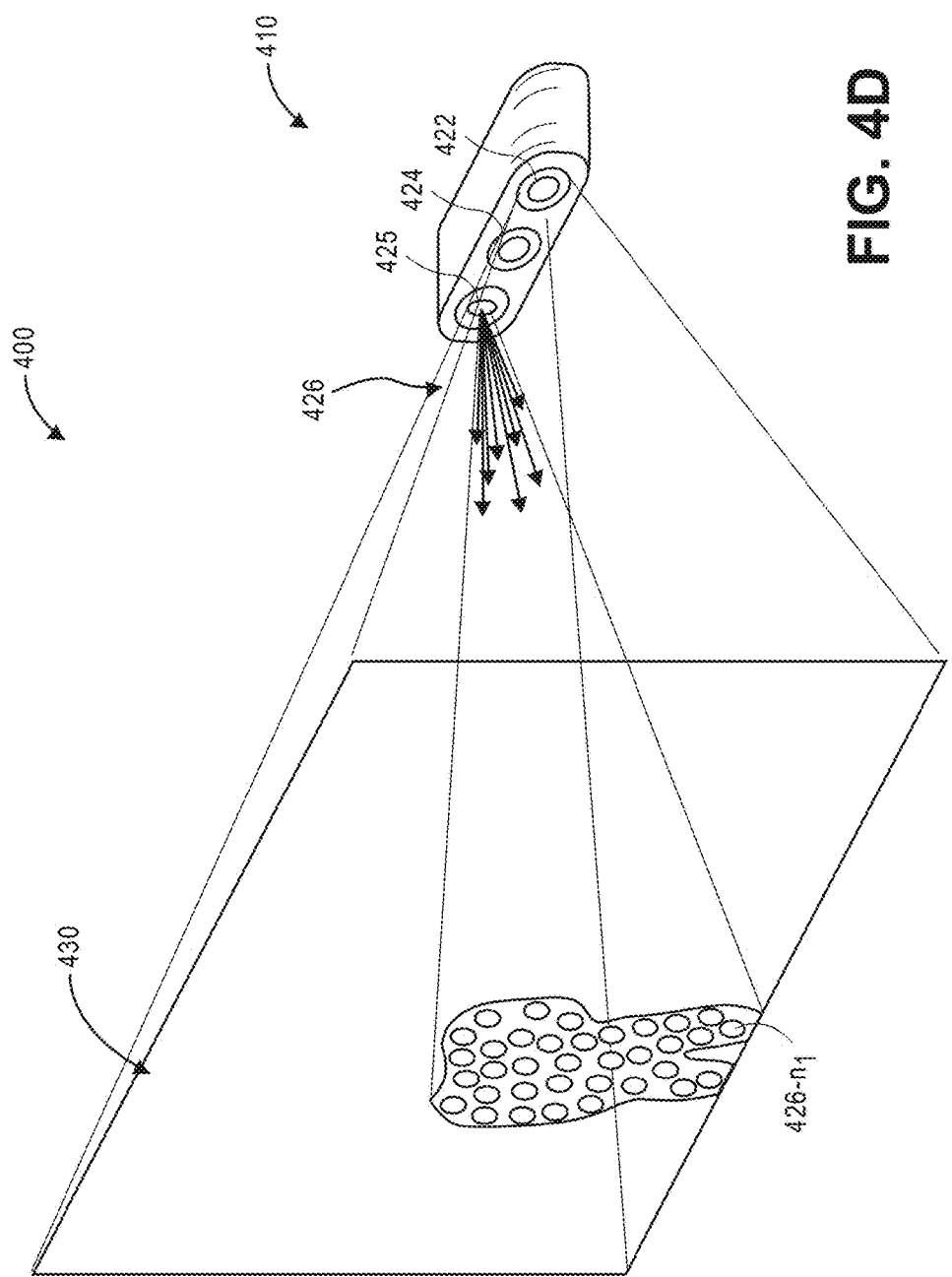
Figure 4E:
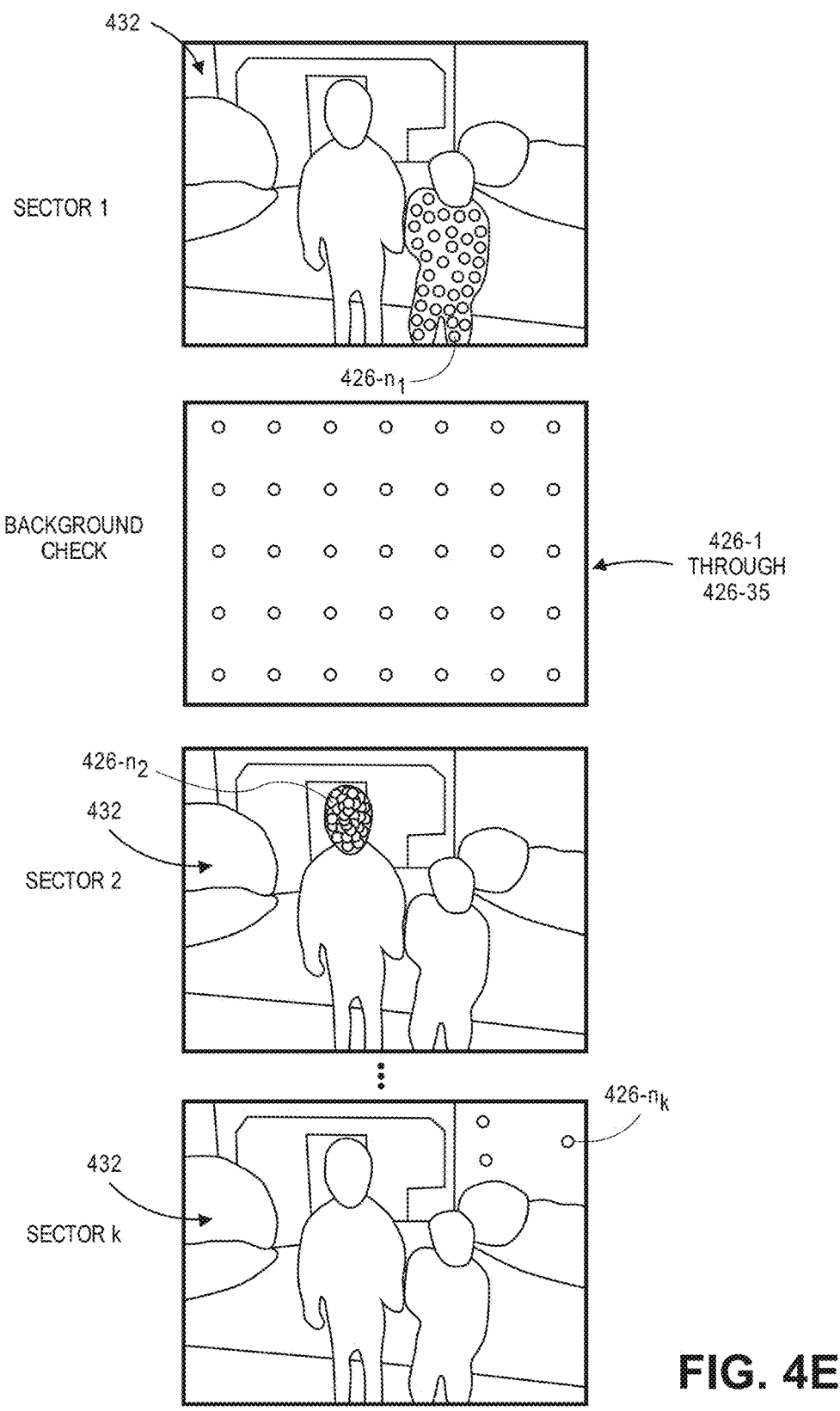

As is shown in FIG. 4D and FIG. 4E, the projector 425 may be programmed to direct discrete pluralities of points of light onto each of the k sectors within the outline 434. For example, as is shown in FIG. 4D, a plurality of points of light 426-$n_1$ may be projected onto a first sector within the outline 434, corresponding to one of the objects or regions within the scene 430. The number of the points included in the plurality of points of light 426-$n_1$ may be selected based on any attributes of the first sector, and may be greater than, equal to, or less than, the number of the points included in the plurality of points of light 426-1 through 426-35 that were initially projected upon the scene 430, as is shown in FIG. 4B, and from which the depth image 436 was initially formed. Depth values determined based on captured reflections of the plurality of points of light 426-$n_1$ projected upon the first sector may be interpreted according to any range imaging techniques and used to update the depth image 436 accordingly.

Subsequently, the scene 430 may be further evaluated periodically in order to determine whether contents of the scene 430 have changed. For example, as is also shown in FIG. 4E, the plurality of points of light 426-1 through 426-35 that were initially projected upon the scene 430 may be subsequently projected thereon again, and any changes in the depth values determined based on reflections of such points may be used to determine whether a new object has entered the scene 430, or departed from the scene 430, since the depth image 436 was originally formed. Alternatively, or concurrently, one or more visual images may be captured from the scene 430 as a whole, or from one or more of the k sectors in particular, and evaluated to determine whether any new objects have entered the scene 430, or departed from the scene 430, since the depth image 436 was originally formed. If any changes to the scene 430 are observed, the outline 434 may be updated accordingly, and another plurality of points of light may be projected upon one or more of the sectors within the updated outline 434, as necessary.

After the contents of the scene 430 are determined to have not changed, or to have changed to only an insubstantial or acceptable degree, another plurality of points of light 426-$n_2$ may be projected onto a second sector within the outline 434, corresponding to another of the objects or regions within the scene 430. As with the plurality of points of light 426-$n_1$, a number of the points included in the plurality of points of light 426-$n_2$ projected upon the second sector may be selected based on any attributes of the second sector, and may be greater than, equal to, or less than, the number of the points included in the plurality of points of light 426-1 through 426-35 that were initially projected upon the scene 430, or the number of the points included in the plurality of points of light 426-$n_1$ projected upon the first sector. Depth values determined based on captured reflections of the plurality of points of light 426-$n_2$ projected upon the second sector may be interpreted according to any range imaging techniques and used to update the depth image 436 accordingly.

Figure 4F:

As is shown in FIG. 4F, each of the k sectors within the outline 434 may be evaluated by projecting pluralities of points of light 426-$n_1$ through 426-$n_k$ upon each of such sectors and interpreting captured reflections of such points according to any range imaging techniques. Where a sector includes objects of critical importance, or features significant variations in depth, color, texture, curvature or other attributes, or attributes that are regularly changing, that sector may be sampled using larger numbers of points of light, or at greater frequencies. Where a sector includes objects of lesser importance, or features insignificant variations in depth, color, texture, curvature or other attributes, or attributes that infrequently change, however, that sector may be sampled with smaller numbers of points of light, or at lower frequencies. The captured reflections of the pluralities of points of light 426-$n_1$ through 426-$n_k$, may be interpreted according to any range imaging techniques and used to update the depth image 436 accordingly.

Figure 4G:
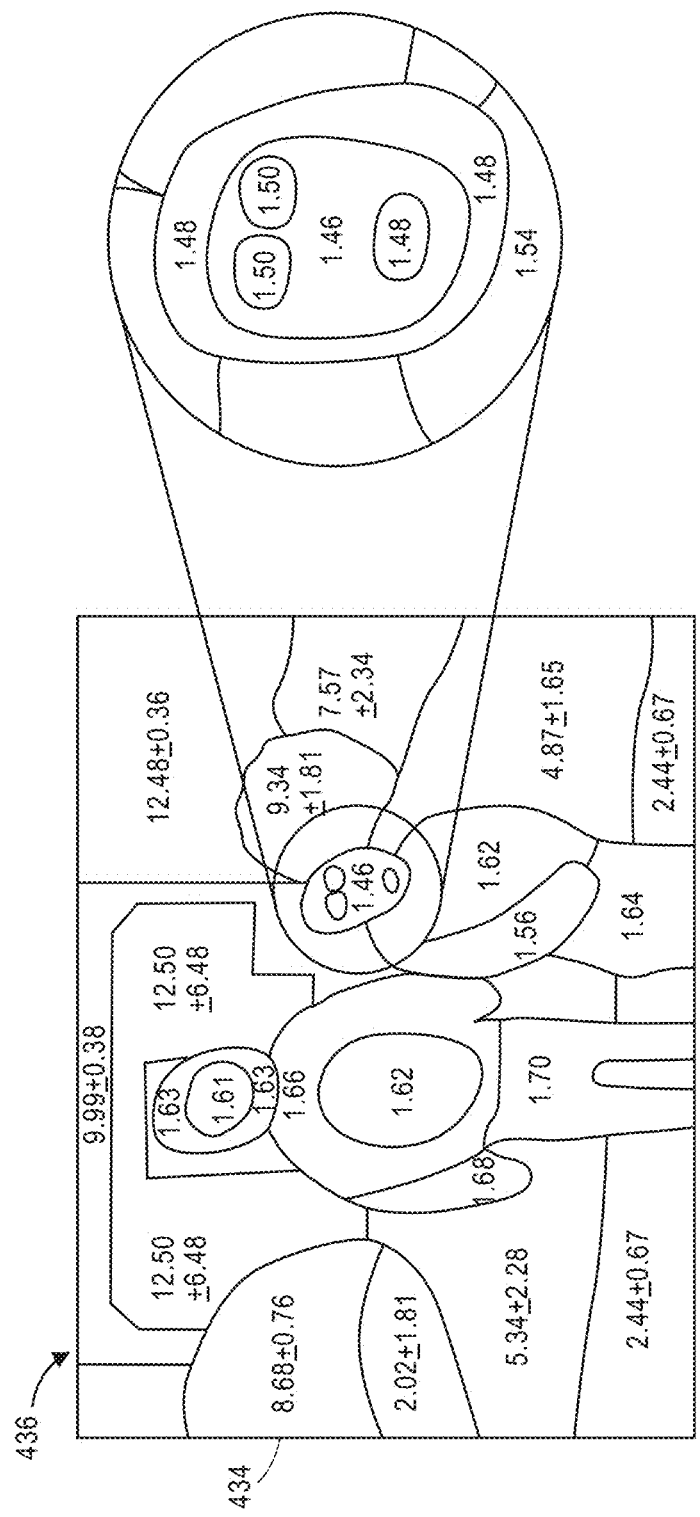

As is shown in FIG. 4G, after each of the k sectors has been evaluated, the updated depth image 436 may reflect depths or ranges to various objects or regions within the scene 430, including foreground or background objects, and to degrees of tolerance reflective of the variation in depth, color, texture, curvature or other attributes of each of such objects. The depth resolution or precision of portions of the updated depth image 436 may vary on any basis, including but not limited to a number of points of light 426-$n_1$ through 426-$n_k$ projected upon each of the various sectors.

As is discussed above, a number of points of light projected on each of a plurality of regions or sectors of an image may be selected on any basis. For example, points of light may be projected in an even distribution across a scene without regard to any specific objects or regions that may be included therein. Points of light may also be projected toward specific portions of a scene, including such portions having high levels of variation in depth, color, texture, curvature or other attributes, or such portions corresponding to edges, contours, outlines, colors, textures, silhouettes or shapes of objects or regions within the scene.

Figure 5A:
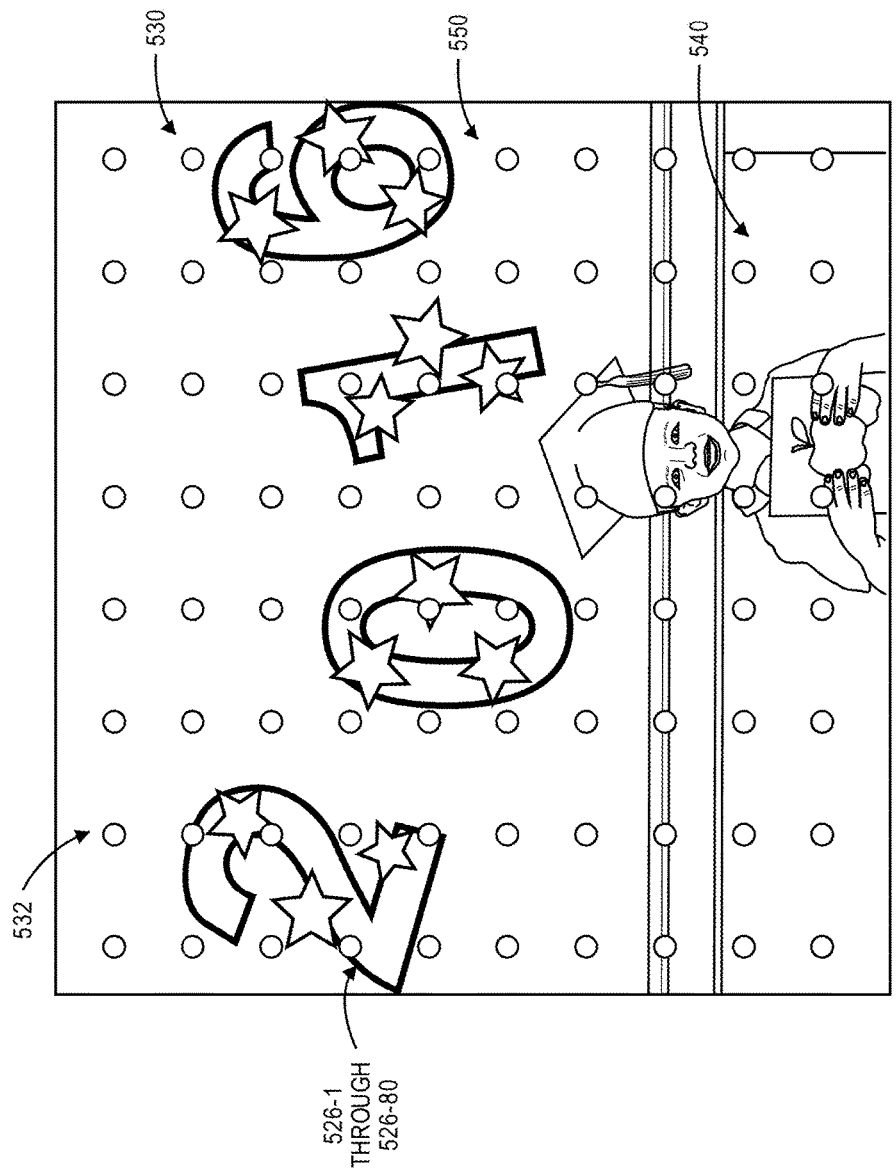
FIGS. 5A through 5C are views of aspects of one system for depth sensing in accordance with embodiments of the present disclosure.
Figure 5B:
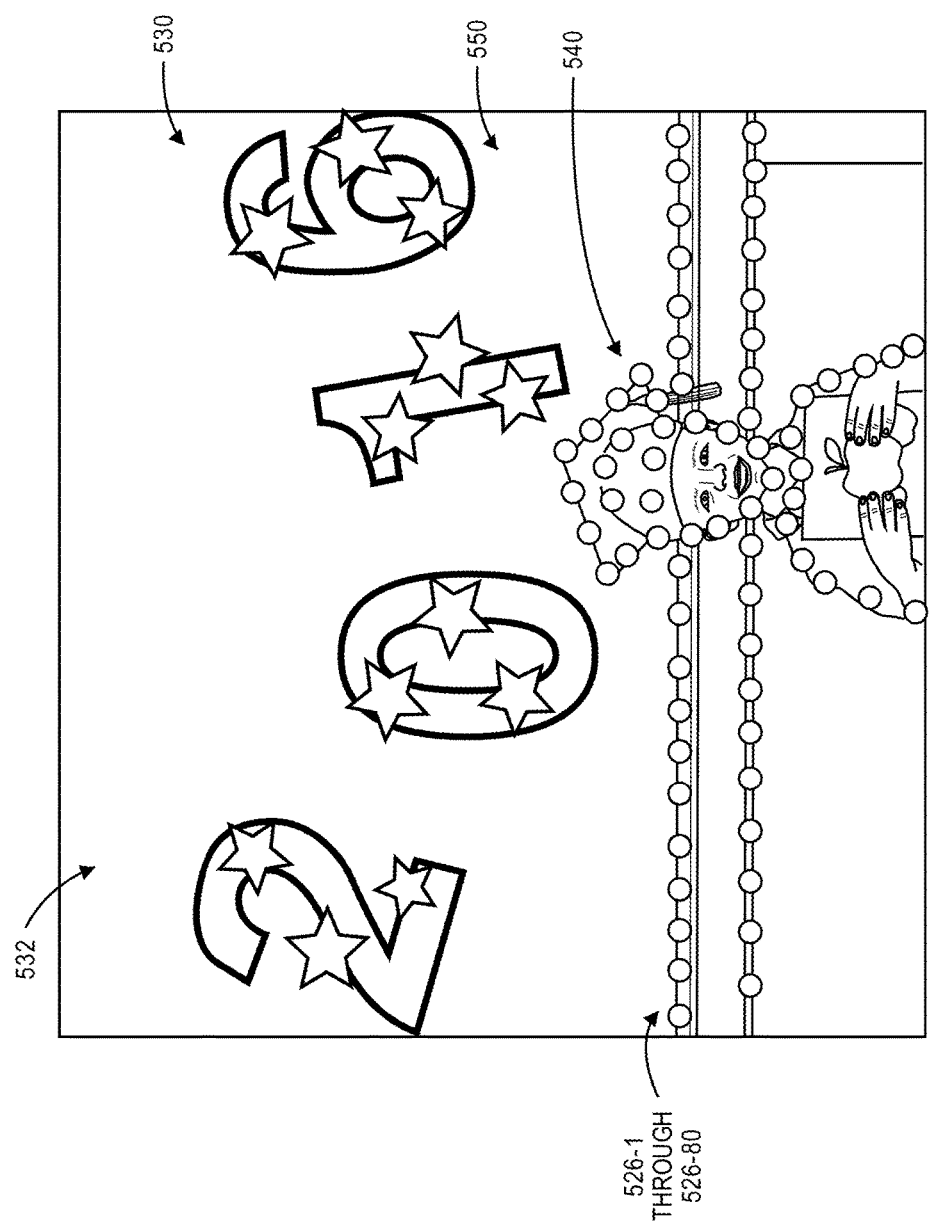
Figure 5C:
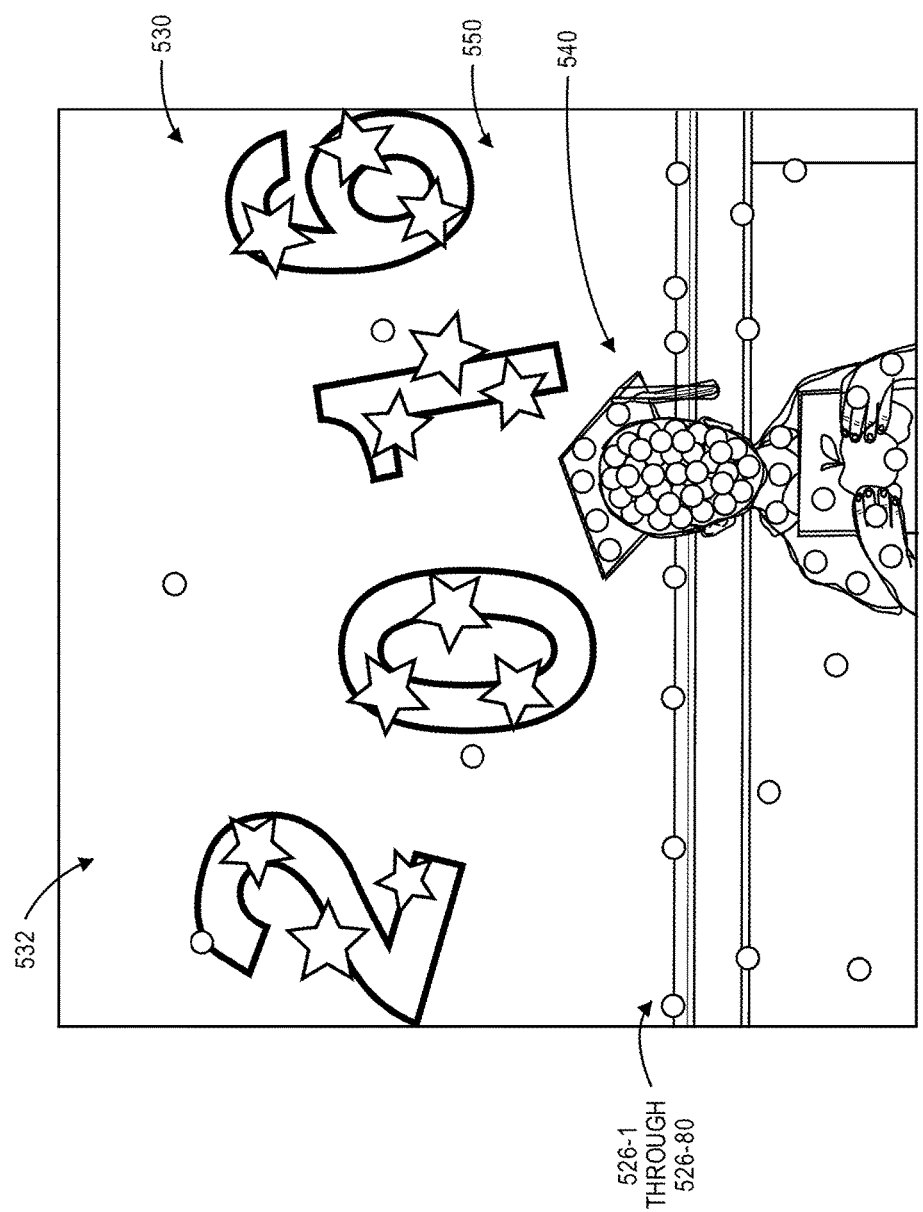

Referring to FIGS. 5A through 5C, views of aspects of one system for depth sensing in accordance with embodiments of the present disclosure are shown. Except where otherwise noted, reference numerals preceded by the number "5" shown in FIGS. 5A through 5C indicate components or features that are similar to components or features having reference numerals preceded by the number "4" shown in FIGS. 4A through 4G, by the number "2" shown in FIG. 2 or by the number "1" shown in FIGS. 1A through 1H.

As is shown in FIG. 5A, a scene 530 includes a plurality of foreground objects 540 (e.g., a boy wearing a cap and gown, holding a diploma) and a plurality of background objects 550 (e.g., a wall with molding and hanging artwork), as is shown in a color image 532 of the scene 530. A first plurality of points of light 526-1 through 526-80 may be projected upon the scene 530 in order to obtain a general representation of the depths or ranges to the various portions of the scene 530, e.g., the foreground objects 540 and the background objects 550.

As is shown in FIG. 5B, a second plurality of points of light 526-1 through 526-80 may be projected onto boundaries of the various foreground objects 540 and background objects 550 within the scene 530, e.g., in order to increase the depth resolution with regard to such objects. In particular, as is shown in FIG. 5B, the second plurality of points of light 526-1 through 526-80 is projected upon molding on the wall, as well as edges and other features of the child and his cap. As a result, more detailed depth information may be desired in order to more properly define such boundaries, or to determine characteristics of such boundaries in greater detail. Therefore, the second plurality of points of light 526-1 through 526-80 may be directed and/or concentrated on such boundaries, and depth values regarding such boundaries may be determined based on reflections of the points of light 526-1 through 526-80 captured by a depth sensor or other imaging device.

As is shown in FIG. 5C, a third plurality of points of light 526-1 through 526-80 may be projected onto objects or regions of interest within the scene 530 based on a level of priority or interest in such objects or regions. For example, as is shown in FIG. 5C, where regions having high levels of entropy (e.g., high levels of depth, color, texture or curvature variation) are identified within one or more of the foreground objects 540 (e.g., a face and other portions of the boy) at the scene 530, a greater degree of depth resolution may be desired or required from such regions. Therefore, an increased concentration or density of the points may be directed to the regions having the high levels of entropy. Conversely, where regions having low levels of entropy (e.g., low levels of depth, color, texture or curvature variation) are identified within portions of the foreground objects 540 or the background objects 550 at the scene, a lesser degree of depth resolution may be desired or required from such regions. Therefore, a reduced concentration or density of the points may be directed to the regions having the low levels of entropy.

Accordingly, an enhanced depth evaluation of portions of a scene may be conducted by directing points of light, or patterns of such points, onto such portions in concentrations or densities that may be selected based on intrinsic properties of such portions (e.g., levels of depth, color, texture or curvature variation of such portions), or on the contents of such portions. In some embodiments, the same number of points that may be projected upon a scene as a whole, such as is shown in FIG. 5A, may be projected upon selected objects or regions within the scene, such as is shown in FIG. 5B or in FIG. 5C. Where the same number of points of light are projected upon a selected region or sector, evaluating reflections of such light from the selected region or sector does not overburden an imaging device, or overwhelm the bandwidth, processing power, storage capacity or other resources of the imaging device, yet provides detailed depth information regarding background or foreground objects within the selected region or sector. In some other embodiments, a greater number, or a lesser number, of such points may be projected upon the selected region or sector.

The systems and methods of the present disclosure need not utilize a color image (or other visual image) in order to identify regions of a scene for which an enhanced depth evaluation is desired. Instead, such regions may be identified based on initial depth values determined based on captured reflections of points of light initially projected upon the scene. Where significant variations in such depth values are identified, pluralities of points of light may be subsequently projected upon regions associated with such variations, e.g., between locations within the scene from which such reflections were captured, in order to increase the accuracy or precision of depth values obtained from such regions.

Figure 6:
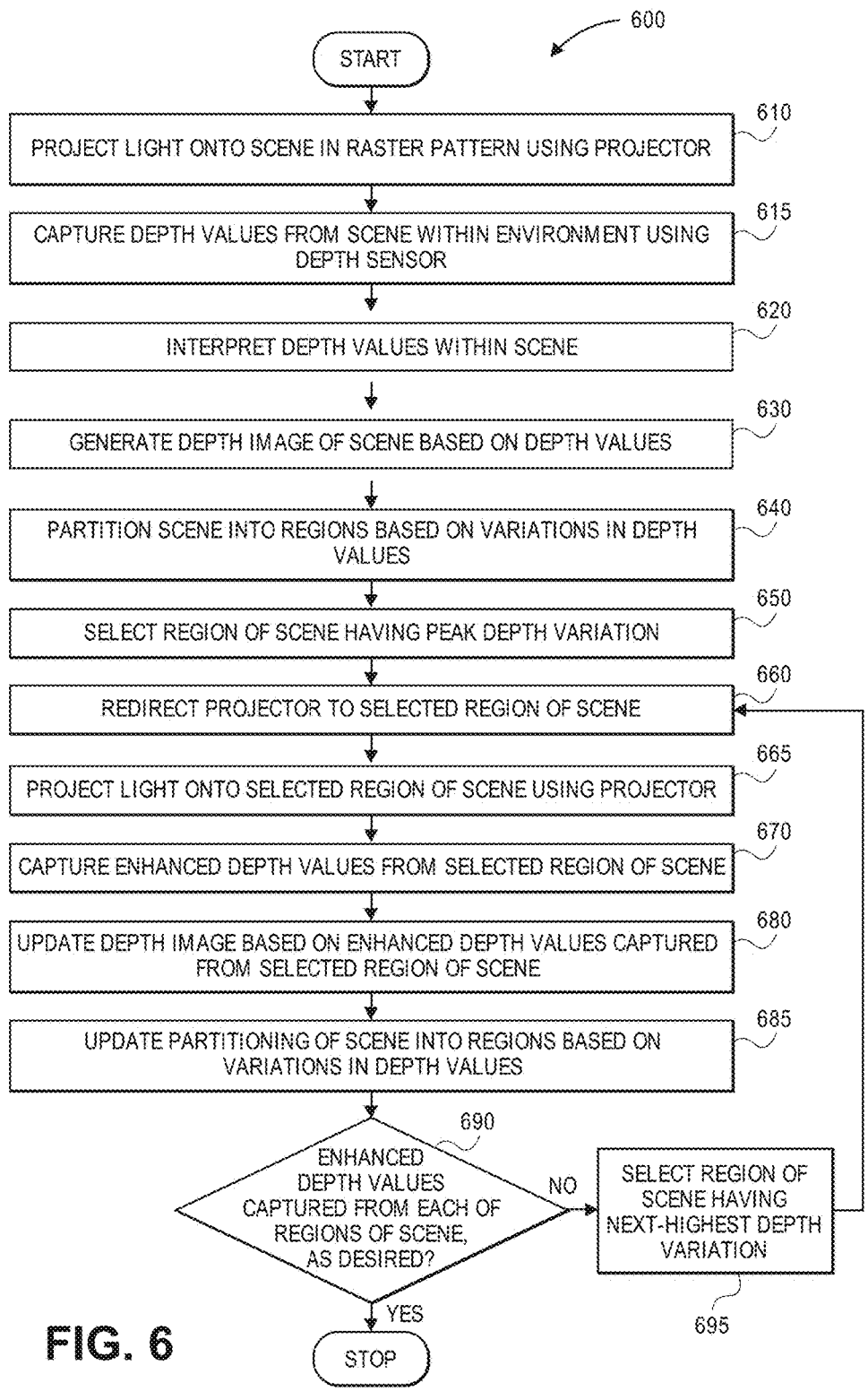
FIG. 6 is a flow chart of one process for depth sensing in accordance with embodiments of the present disclosure.

Referring to FIG. 6, a flow chart 600 of one process for depth sensing in accordance with embodiments of the present disclosure is shown. At box 610, light is projected onto a scene in a raster pattern using a projector. At box 615, depth values are captured from a scene within an environment using a depth sensor, and at box 620, the depth values within the scene are interpreted accordingly. For example, one or more patterns of structured light may be projected upon the scene, and distortions in the captured reflections of such patterns are interpreted to determine ranges to portions of the scene from which the patterns were reflected. Alternatively, one or more points of light may be projected upon portions of a scene, and ranges to such portions may be determined based on a time elapsed between the projections of such points and the capture of the reflections of such points from such portions. At box 630, a depth image, e.g., a two-dimensional representation of depths or ranges to objects or other elements, of the scene is generated based on the depth values.

At box 640, the scene is partitioned into regions based on variations in the depth values. For example, regions may be defined based on differences between depth values of adjacent points, such that the regions each represent portions of the scene having depths that are substantially constant or infrequently changing. Portions of the scene having substantially constant depth values may be represented as discrete regions of any size, e.g., similar to a contour map, in which regions of high relative inclines are small, while regions of low relative inclines are comparatively larger. At box 650, a region of the scene having a peak depth variation is selected. For example, based on the depth image, a pair of adjacent depth values having a maximum difference between them, or pairs of adjacent depth values having differences in excess of a predetermined threshold, may be identified and selected.

At box 660, the projector is redirected to the selected region of the scene, and at box 665, light is projected onto the selected region by the projector. The light may be projected in the form of one or more points of light, or one or more patterns of such points. At box 670, enhanced depth values are captured from the selected region of the scene, e.g., using a depth sensor, according to a structured-light technique, a time-of-flight technique, or any other range imaging technique. At box 680, the depth image is updated based on the enhanced depth values captured from the selected region of the scene. For example, where the selected region lies between two points for which a variation in depth values was comparatively high, projecting increased numbers or concentrations of points into the selected region, and interpreting captured reflections of such points accordingly, results in an increased number of depth values within the selected region, and greater resolution as to the ranges to objects within that region.

At box 685, the partitioning of the scene into regions based on variations in depth values may be updated, as necessary. For example, if the depth values captured from within the selected region of the scene at box 670 indicate that one or more additional regions of substantially constant depths or ranges may be identified within the selected region, the partitioning may be revised to include the additional regions. At box 690, whether enhanced depth values are captured from each of the regions of the scene, as desired, is determined. If depth values have been captured from each of the regions of the scene, then the process ends. If depth values have not been captured from each of the regions of the scene, however, then the process advances to box 695, where a region of the scene having the next-highest depth variation is selected, before returning to box 660, where the projector is redirected to the selected region. Alternatively, one or more of the regions of the scene may be omitted or overlooked, on any basis or for any reason, such as where it is already known that such regions are irrelevant, or less relevant, or where depth information regarding such regions is already known to a sufficient level of detail.

Thus, as is discussed above, a depth image of a scene, or a set of depth information regarding the scene, may be generated and iteratively refined by redirecting a projector to selected regions of the scene based on variations in depth within such regions, or on any other basis. Referring to FIGS. 7A through 7G, views of aspects of one system for depth sensing in accordance with embodiments of the present disclosure are shown. Except where otherwise noted, reference numerals preceded by the number "7" shown in FIGS. 7A through 7G indicate components or features that are similar to components or features having reference numerals preceded by the number "5" shown in FIGS. 5A through 5C, by the number "4" shown in FIGS. 4A through 4G, by the number "2" shown in FIG. 2 or by the number "1" shown in FIGS. 1A through 1H.

Figure 7A:
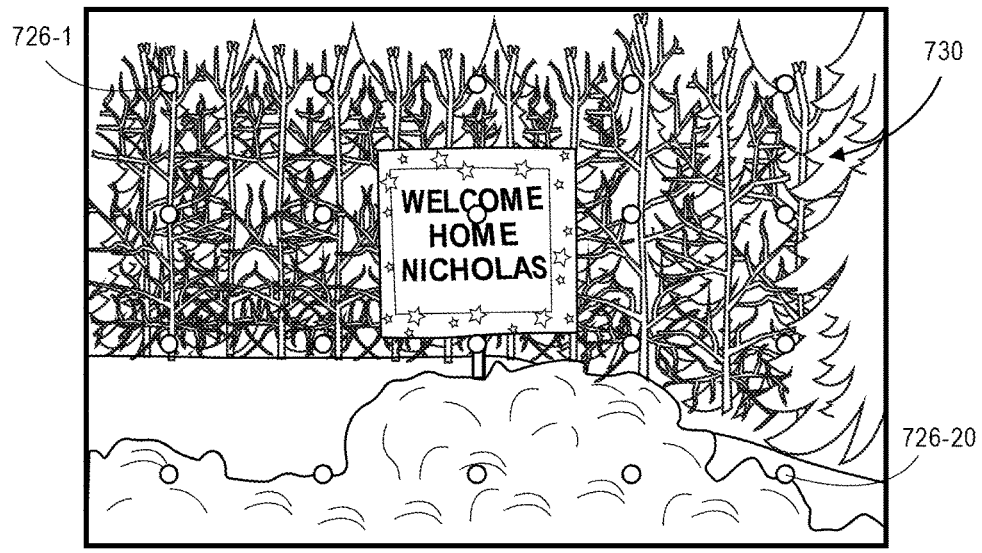
FIGS. 7A through 7G are views of aspects of one system for depth sensing in accordance with embodiments of the present disclosure.
Figure 7B:
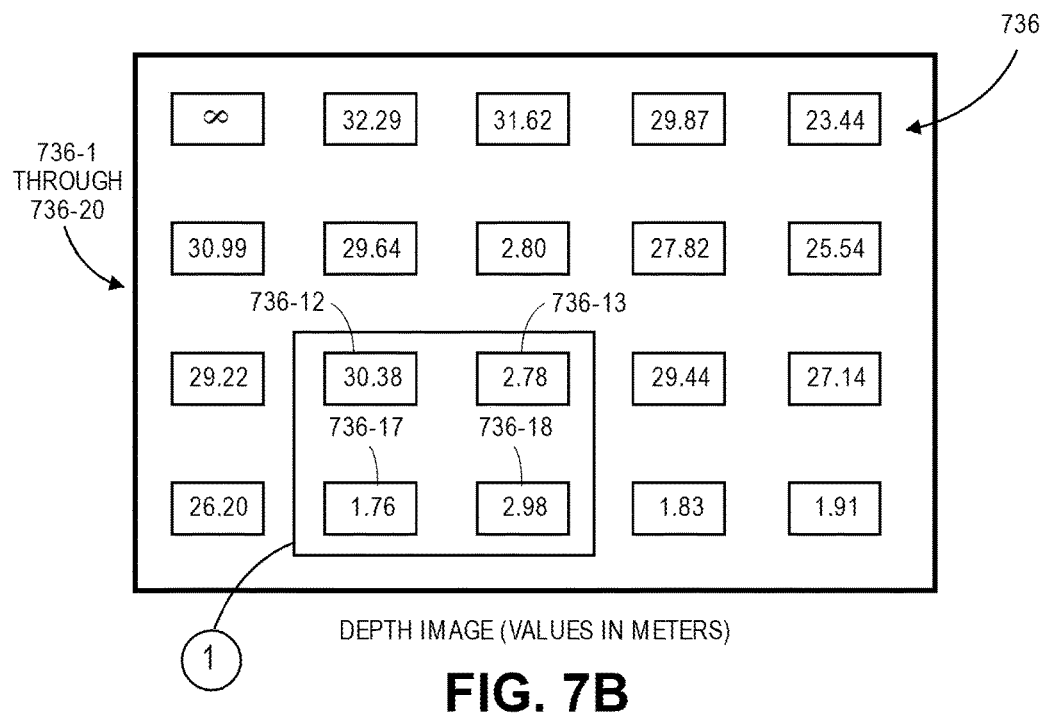

As is shown in FIGS. 7A and 7B, a plurality of points of light 726-1 through 726-20 may be projected upon a scene 730, and a depth image 736 may be derived from a plurality of depth values 736-1 through 736-20 determined based on the captured reflections of the plurality of points of light 726-1 through 726-20 from the scene 730. Based on the depth values 736-1 through 736-20, a first region of the scene 730 having maximum depth variation, e.g., the region between the points 736-12, 736-13, 736-17, 736-18 numbered 1 in FIG. 7B, may be identified. For example, as is shown in FIGS. 7B and 7C, the depth value 736-12 corresponds to a distance to a background feature (e.g., a tree) within the scene 730, while the depth values 736-13, 736-17, 736-18 correspond to distances to foreground features (e.g., a sign posted in a snowbank, and the snowbank) within the scene 730.

Figure 7C:
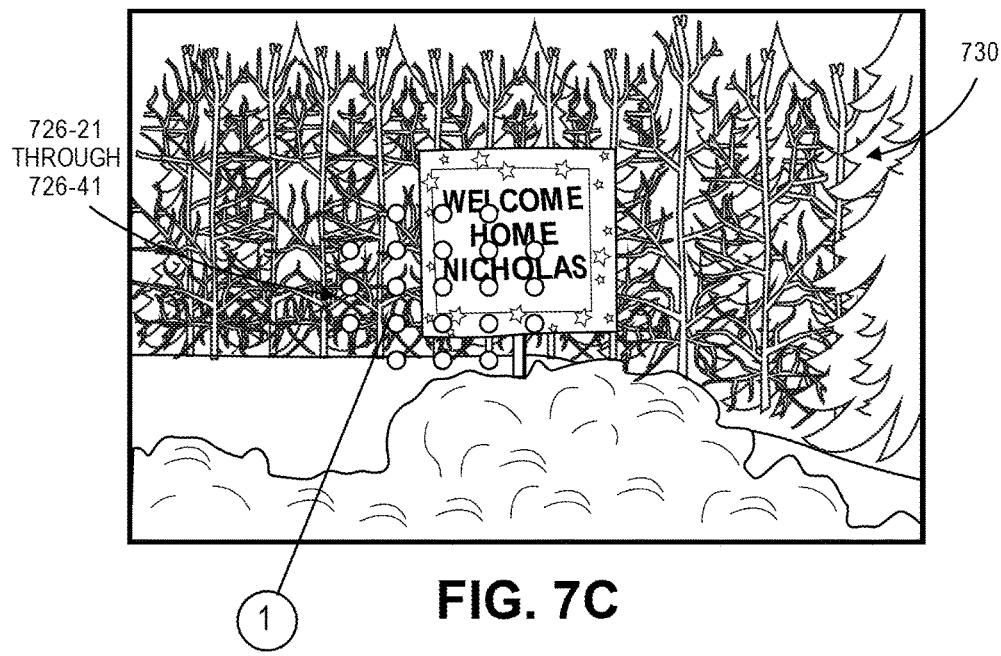
Figure 7D:
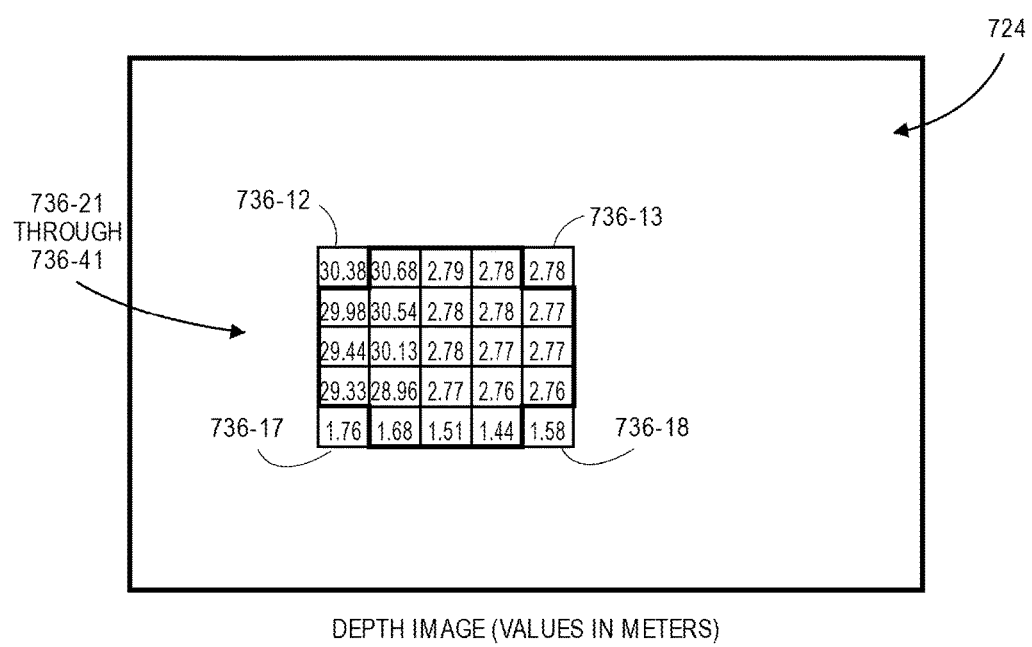

Subsequently, as is shown in FIGS. 7C and 7D, a plurality of points of light 726-21 through 726-41 may be projected into the region of the scene 730 having maximum depth variation, and the depth image 736 may be updated based on a plurality of depth values 736-21 through 736-41 determined from the captured reflections of the plurality of points of light 726-21 through 726-41 from the scene 730. Because the plurality of points of light 726-1 through 726-20 and the plurality of points of light 726-21 through 726-41 include a nearly identical number of points, little to no additional bandwidth, processing power or storage capacity is required in order to interpret the reflections of the points of light 726-21 through 726-41, to determine the depth values 736-21 through 736-41, or to update the depth image 736 based on such values, despite the fact that the clarity and resolution of the depth image 736 within the region of the scene 730 is significantly enhanced due to the increased density of depth values within that region.

Figure 7E:
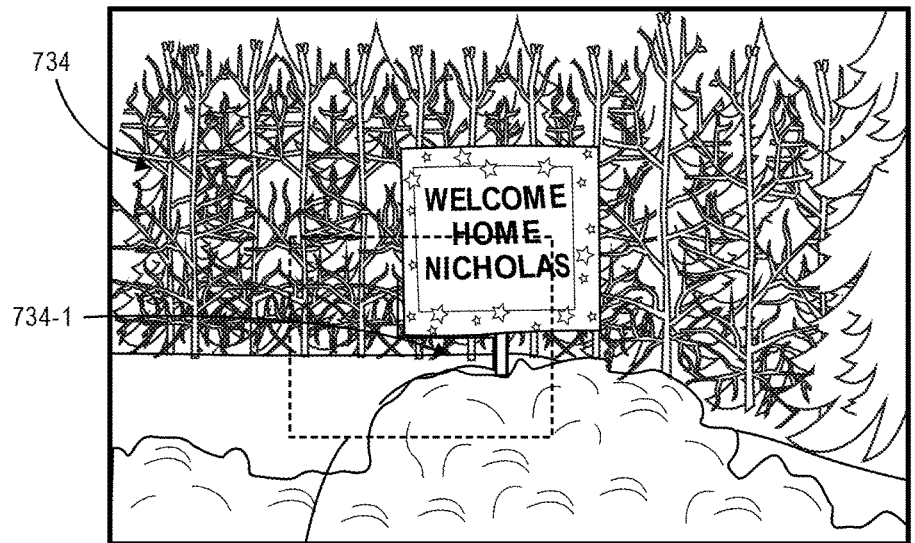
Figure 7F:
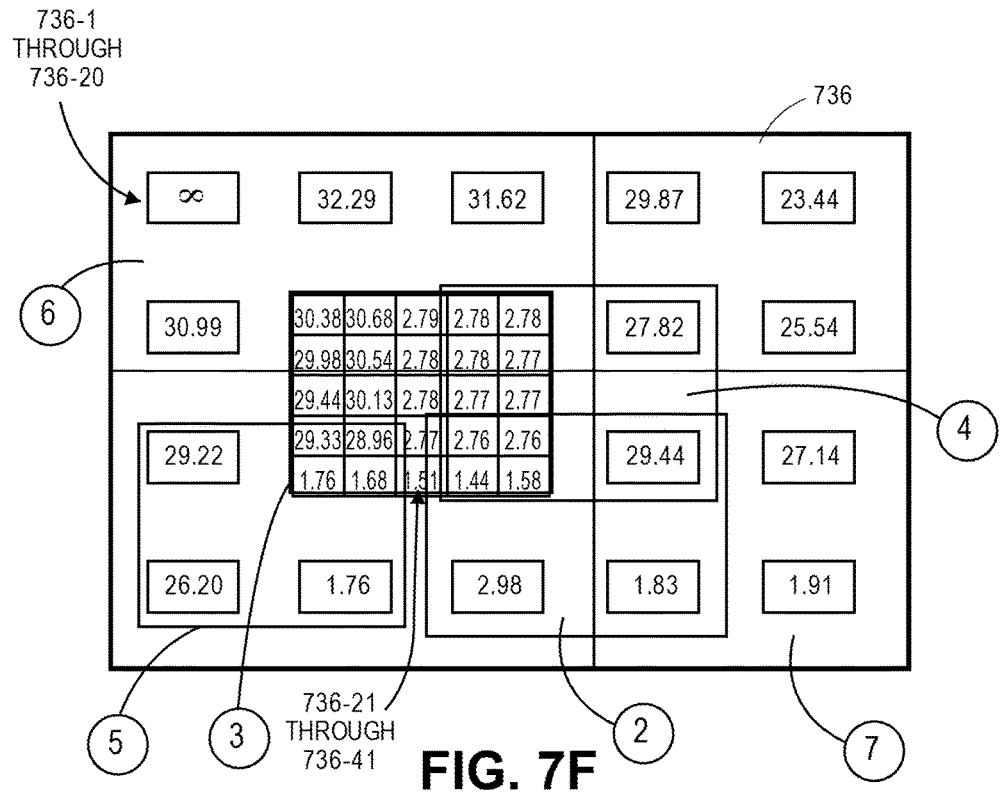
Figure 7G:
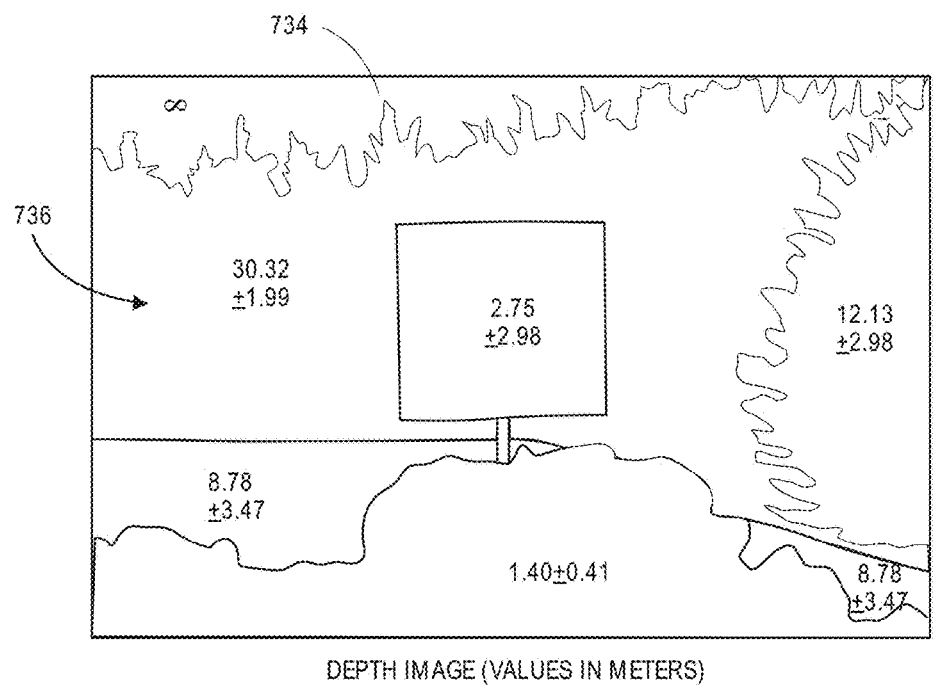

As is shown in FIG. 7E, after the depth image 736 has been updated to include the depth values 736-21 through 736-41, an outline 734 of objects or regions within the scene 730 may be formed beginning with a portion 734-1 of the outline 734 corresponding to the region of the scene 730 from which the depth values 736-21 through 736-41 were determined. Additionally, as is shown in FIG. 7F, other regions of the scene 730 (e.g., the regions numbered 2 through 7 in FIG. 7F) having descending levels of depth variation within the depth image 736 may be identified and sampled using pluralities of points of light, or patterns of such points, projected into such regions for range imaging. As is shown in FIG. 7G, after each of the regions of the scene 730 has been sampled, the outline 734 may be completed, and the depth image 736 may sufficiently represent depths or ranges to each of the objects within the scene 730 accordingly. Alternatively, as is discussed above, one or more of the regions of the scene may be omitted or overlooked, on any basis or for any reason, for the purpose of sampling for depth values or updating the depth image 736.

Figure 8:
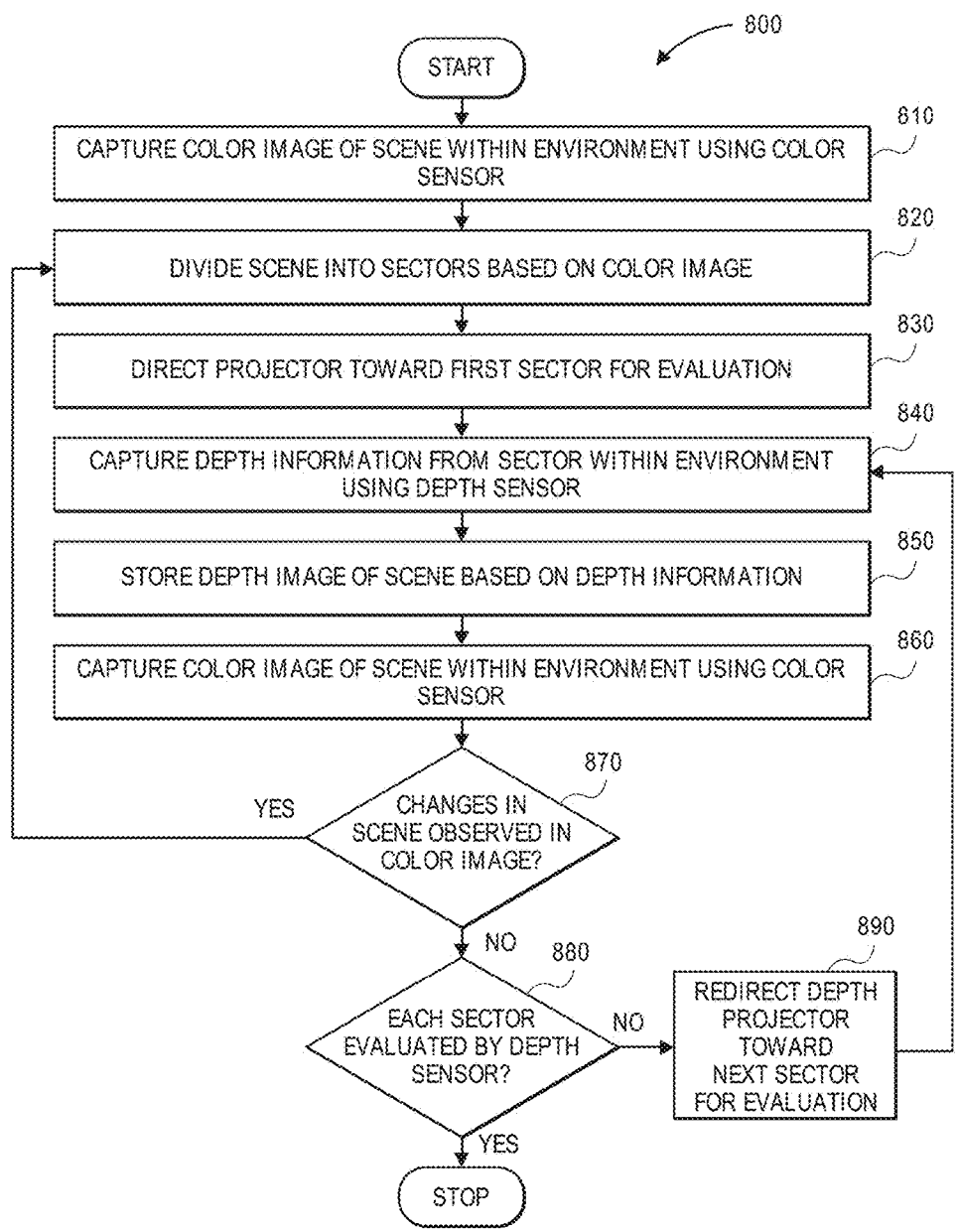
FIG. 8 is a flow chart of one process for depth sensing in accordance with embodiments of the present disclosure

As is discussed above, as a depth model or a depth profile of a scene are being generated, or as ranges to objects or regions within the scene are being determined, the scene may be periodically evaluated to determine whether one or more objects have entered the scene, or departed from the scene. Referring to FIG. 8, a flow chart 800 of one process for depth sensing in accordance with embodiments of the present disclosure is shown. At box 810, a color image of a scene within an environment is captured using a color sensor, and at box 820, the scene is divided into a plurality of sectors based on the color image. For example, one or more edges, contours, outlines, colors, textures, silhouettes or shapes may be identified within the color image according to any number of detection or recognition techniques.

At box 830, a projector is directed toward a first one of the sectors for evaluation. The projector may be configured to project points of light at any frequency or wavelength, or patterns of such points, onto the sector or other aspects of the scene, e.g., in a regular distribution, or a raster pattern. At box 840, depth information is captured from the sector using a depth sensor. For example, an RGBz camera or other suitable imaging device may project points of infrared light (or patterns of such points) therefrom onto surfaces of a scene, and capture and interpret reflections of such points from such surfaces. At box 850, a depth image of the scene is stored based on the captured depth information. For example, referring again to FIG. 1E, a depth image 136 is formed from the depth values 136-1 through 136-49 derived from the reflections of the points 126-1 of light, with each of the depth values 136-1 through 136-49 corresponding to a distance between a depth sensor of the imaging device 110 and one or more aspects of the scene 130.

At box 860, a color image of the scene within the environment is captured using the color sensor. The color image may be intended to search or evaluate the scene for newly arriving or departing objects, and may include all of the scene, or portions of the scene, e.g., portions of the scene not including the sector from which the depth information was captured at box 840. The color image of the scene captured at box 860 may be compared to the color image of the scene that was captured at box 810, or to other color images previously captured from the scene, or may be subjected one or more detection or recognition techniques, to determine whether the contents of the scene have changed. At box 870, whether any changes in the scene are observed in the color image captured at box 860 is determined. If any such changes are observed, then the process returns to box 820, where the scene may be divided again into a plurality of sectors based on the color image, e.g., by identifying one or more edges, contours, outlines, colors, textures, silhouettes or shapes within the color image.

If no such changes are observed, then the process advances to box 880, where whether each of the sectors of the scene has been evaluated by the depth sensor is determined. If any of the sectors have not yet been evaluated, then the process advances to box 890, where the projector is redirected toward a next sector for evaluation. If each of the sectors has been evaluated, however, then the process ends.

Although the disclosure has been described herein using exemplary techniques, components, and/or processes for implementing the systems and methods of the present disclosure, it should be understood by those skilled in the art that other techniques, components, and/or processes or other combinations and sequences of the techniques, components, and/or processes described herein may be used or performed that achieve the same function(s) and/or result(s) described herein and which are included within the scope of the present disclosure.

It should be understood that, unless otherwise explicitly or implicitly indicated herein, any of the features, characteristics, alternatives or modifications described regarding a particular embodiment herein may also be applied, used, or incorporated with any other embodiment described herein, and that the drawings and detailed description of the present disclosure are intended to cover all modifications, equivalents and alternatives to the various embodiments as defined by the appended claims. Moreover, with respect to the one or more methods or processes of the present disclosure described herein, including but not limited to the flow charts shown in FIG. 3, 6 or 8, orders in which such methods or processes are presented are not intended to be construed as any limitation on the claimed inventions, and any number of the method or process steps or boxes described herein can be combined in any order and/or in parallel to implement the methods or processes described herein. Also, the drawings herein are not drawn to scale.

Conditional language, such as, among others, "can," "could," "might," or "may," unless specifically stated otherwise, or otherwise understood within the context as used, is generally intended to convey in a permissive manner that certain embodiments could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The elements of a method, process, or algorithm described in connection with the embodiments disclosed herein can be embodied directly in hardware components, in a software module stored in one or more memory devices and executed by one or more processors, or in a combination of hardware components and software modules. A software module can reside in RAM, flash memory, ROM, EPROM, EEPROM, registers, a hard disk, a removable disk, a CD-ROM, a DVD-ROM or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC. The ASIC can reside in a user terminal. In the alternative, the processor and the storage medium can reside as discrete components in a user terminal.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative embodiments thereof, the foregoing and various other additions and omissions may be made therein and thereto without departing from the spirit and scope of the present disclosure.

What is claimed is:

1. An imaging system comprising:
   a visual imaging sensor;
   a depth imaging sensor;
   a light projector;
   at least one data store; and
   at least one computer processor configured to at least:
      capture first visual imaging data from a scene by the visual imaging sensor;

configure the light projector to project a first plurality of points of light onto the scene in a first pattern, wherein the first pattern comprises a raster pattern;
project the first plurality of points of light onto the scene in the first pattern;
capture first depth imaging data from the scene by the depth imaging sensor, wherein the first depth imaging data comprises information regarding reflections of at least some of the first plurality of points of light;
generate a model of at least a portion of the scene based at least in part on the first visual imaging data and the first depth imaging data;
store the model in the at least one data store;
select a first aspect of the model;
configure the light projector to project a second plurality of points of light onto a portion of the scene in a second pattern, wherein the portion of the scene corresponds to the first aspect of the model;
project the second plurality of points of light onto the portion of the scene in the second pattern;
capture second depth imaging data from the scene by the depth imaging sensor, wherein the second depth imaging data comprises information regarding reflections of at least some of the second plurality of points of light from the portion of the scene;
update the model based at least in part on the second depth imaging data; and
store the updated model in the at least one data store.

2. The imaging system of claim 1, wherein the first plurality of points comprises a first number of points,
wherein the second plurality of points comprises a second number of the points, and
wherein the second number is not greater than the first number.

3. The imaging system of claim 1,
wherein the at least one computer processor is further configured to at least:
recognize a distortion in at least one of the reflections of the at least some of the first plurality of points of light; and
determine a range associated with the first aspect of the model based at least in part on the distortion.

4. The imaging system of claim 1, wherein the at least one computer processor is further configured to at least:
determine a first time at which the first plurality of points of light are projected by the light projector;
determine a second time at which at least one of the reflections of the first plurality of points of light is captured by the depth imaging sensor;
calculate a product of the speed of light and a difference between the second time and the first time; and
determine a range associated with the first aspect of the model based at least in part on the product.

5. A computer-implemented method comprising:
identifying a first set of imaging data captured from a field of view of an imaging device, wherein the field of view includes a scene, and wherein the first set of imaging data comprises at least one of first visual imaging data or first depth imaging data;
selecting a first subset of the field of view based at least in part on the at least one of the first visual imaging data or the first depth imaging data;
configuring the imaging device to project a first plurality of points of light onto a first portion of the scene, wherein the first portion of the scene is within the first subset of the field of view;
projecting the first plurality of points of light onto the first portion of the scene by the imaging device;
capturing second depth imaging data from the first subset of the field of view, wherein the second depth imaging data comprises information regarding reflections of at least some of the first plurality of points of light projected onto the first portion of the scene by the imaging device within the first subset of the field of view;
generating a depth profile based at least in part on the second depth imaging data; and
storing the depth profile in at least one data store.

6. The computer-implemented method of claim 5, wherein the first set of imaging data comprises the first visual imaging data, and
wherein the computer-implemented method further comprises:
defining a plurality of regions of the scene within the first visual imaging data,
wherein the first portion of the scene includes at least one of the plurality of regions of the scene within the first visual imaging data.

7. The computer-implemented method of claim 5, wherein selecting the first subset of the field of view comprises:
recognizing at least one of an edge, a contour, an outline, a color, a texture, a silhouette or a shape of an object within the first visual imaging data; and
selecting the first subset of the field of view based at least in part on the at least one of the edge, the contour, the outline, the color, the texture, the silhouette or the shape of the object within the first visual imaging data.

8. The computer-implemented method of claim 7, wherein the object is one of a background element within the scene or a foreground element within the scene.

9. The computer-implemented method of claim 7, wherein the object is at least a portion of a human within the scene.

10. The computer-implemented method of claim 5, wherein the first set of imaging data comprises the first depth imaging data, and
wherein identifying the first set of imaging data captured from the field of view of the imaging device comprises:
configuring the imaging device to project a second plurality of points of light onto the scene in a raster pattern;
projecting the first plurality of points of light onto the scene in the raster pattern by the imaging device; and
capturing the first depth imaging data from the field of view,
wherein the first depth imaging data comprises information regarding reflections of at least some of the second plurality of points of light projected onto the scene in the raster pattern by the imaging device.

11. The computer-implemented method of claim 10, further comprising:
defining a plurality of regions of the scene within the first depth imaging data based at least in part on the information regarding the reflections of the at least some of the second plurality of points of light,
wherein the first subset of the field of view corresponds to one of the plurality of regions within the first depth imaging data.

12. The computer-implemented method of claim 11, wherein the first depth imaging data comprises a plurality of depth values corresponding to the reflections of the at least some of the second plurality of points of light, and wherein defining the plurality of regions of the scene comprises:
identifying depth variations between pairs of adjacent depth values; and
defining the plurality of regions of the scene based at least in part on the depth variations between the pairs of the adjacent depth values,
wherein the first subset of the field of view corresponds to the region having a greatest depth variation.

13. The computer-implemented method of claim 5, further comprising:
selecting a second subset of the field of view based at least in part on the second depth imaging data, wherein at least a portion of the second subset of the field of view is within the first subset of the field of view;
configuring the imaging device to project a second plurality of points of light onto a second portion of the scene, wherein the second portion of the scene is within the second subset of the field of view;
projecting the second plurality of points of light onto the second portion of the scene by the imaging device;
capturing third depth imaging data from the second subset of the field of view, wherein the third depth imaging data comprises information regarding reflections of at least some of the second plurality of points of light projected onto the second portion of the scene within the second subset of the field of view by the imaging device;
updating the depth profile based at least in part on the third depth imaging data; and
storing the updated depth profile in the at least one data store.

14. The computer-implemented method of claim 5, wherein identifying the first set of imaging data captured from the field of view of the imaging device comprises:
capturing the first set of imaging data using the imaging device.

15. The computer-implemented method of claim 5, wherein the first plurality of points of light are projected onto the portion of the scene within the first subset of the field of view in a first pattern, and
wherein capturing the second depth imaging data from the first subset of the field of view comprises:
recognizing a distortion in at least one of the reflections of the at least some of the first plurality of points of light; and
determining at least one range associated with at least the first portion of the scene based at least in part on the distortion.

16. The computer-implemented method of claim 5, wherein capturing the second depth imaging data from the first subset of the field of view comprises:

determining a second time at which at least one of the reflections of the at least some of the first plurality of points of light were captured; and
determining a range associated with at least the portion of the scene based at least in part on a difference between the second time and a first time at which the first plurality of points of light were projected onto the portion of the scene by the imaging device.

17. A computer-implemented method comprising:
projecting first light onto a scene by an imaging device;
capturing first reflections of at least some of the first light projected onto the scene;
determining a first plurality of depth values for the scene based at least in part on the captured first reflections;
selecting a first portion of the scene based at least in part on the first plurality of depth values;
configuring the imaging device to project light onto the first portion of the scene and not onto a second portion of the scene;
projecting second light onto at least the first portion of the scene by the imaging device;
capturing second reflections of at least some of the second light projected onto the portion of the scene;
determining a second plurality of depth values for the portion of the scene based at least in part on the captured second reflections;
generating a depth image of the scene based at least in part on the second plurality of depth values; and
storing the depth image in at least one data store.

18. The computer-implemented method of claim 17, further comprising:
identifying a plurality of variations between pairs of the first plurality of depth values;
selecting one of the pairs of the first plurality of depth values having a greatest one of the plurality of variations; and
identifying points within the scene corresponding to each of the selected one of the pairs of the first plurality of depth values,
wherein the first portion of the scene comprises the identified points.

19. The computer-implemented method of claim 17, wherein the imaging device is configured to project a plurality of points of infrared light.

20. The computer-implemented method of claim 17, wherein the first plurality of depth values or the second plurality of depth values is determined according to a structured-light technique or a time-of-flight technique.

* * * * *